United States Patent
Sakaki et al.

(10) Patent No.: US 6,521,323 B1
(45) Date of Patent: *Feb. 18, 2003

(54) RECORDING MEDIUM

(75) Inventors: Mamoru Sakaki, Yamato (JP); Eiichi Suzuki, Asaka (JP); Masato Katayama, Yokohama (JP); Yutaka Kurabayashi, Tokorozawa (JP); Akio Kashiwazaki, Yokohama (JP); Mifune Hirose, Machida (JP); Katsuhiko Takahashi, Yokohama (JP); Kenichi Moriya, Tokyo (JP); Yuko Nishioka, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/863,719

(22) Filed: May 27, 1997

Related U.S. Application Data

(63) Continuation of application No. 08/363,000, filed on Dec. 23, 1994, now abandoned.

(30) Foreign Application Priority Data

| Dec. 28, 1993 | (JP) | 5-334366 |
| Feb. 2, 1994 | (JP) | 6-011026 |
| Mar. 31, 1994 | (JP) | 6-062962 |
| Jul. 18, 1994 | (JP) | 6-165290 |
| Oct. 27, 1994 | (JP) | 6-263713 |

(51) Int. Cl.⁷ .............................. B41M 5/00

(52) U.S. Cl. .................................... 428/195

(58) Field of Search ............... 428/195, 206, 428/212, 537.5, 480

(56) References Cited

U.S. PATENT DOCUMENTS

| 4,148,639 A | 4/1979 | Sinkovitz et al. .......... 96/1.5 R |
| 4,316,943 A | 2/1982 | Sinkovitz et al. ........ 428/475.8 |
| 4,542,059 A | 9/1985 | Toganoh et al. ............ 428/141 |

(List continued on next page.)

FOREIGN PATENT DOCUMENTS

| DE | 3640359 A1 | 5/1987 |
| EP | 0164196 A1 | 12/1985 |
| EP | 0199874 A1 | 11/1986 |
| EP | 0379964 A1 | 8/1990 |
| JP | 51-13244 | 2/1976 |
| JP | 54-59936 | 5/1979 |
| JP | 56-99693 | 8/1981 |
| JP | 59-35977 | 2/1984 |
| JP | 59-162561 | 9/1984 |
| JP | 59-191068 | 10/1984 |
| JP | 60-220750 | 11/1985 |
| JP | 61-58788 | 3/1986 |
| JP | 1-135682 | 5/1989 |
| JP | 1-190483 | 7/1989 |
| JP | 4-75140 | 3/1992 |

OTHER PUBLICATIONS

Ullmann's Encyclopedia of Industrial Chemistry, Fifth Edition, vol. A9, p. 75.

*Primary Examiner*—Pamela R. Schwartz
(74) *Attorney, Agent, or Firm*—Fitzpatrick, Cella, Harper & Scinto

(57) ABSTRACT

Provided is a recording method for image formation on a recording medium by application thereon of an ink containing a water-soluble dye having an anionic group or a cationic group in the molecule: the recording medium comprising a substance having an ionic group counter to the anionic or cationic group of the water-soluble dye and having molecular weight of not higher than 1,000, and a polymeric substance having molecular weight of not lower than 2,000.

20 Claims, 4 Drawing Sheets

U.S. PATENT DOCUMENTS

| | | |
|---|---|---|
| 4,636,805 A | 1/1987 | Toganoh et al. .............. 346/1.1 |
| 4,686,118 A | 8/1987 | Arai et al. ................... 427/261 |
| 4,723,129 A | 2/1988 | Endo et al. ................... 346/1.1 |
| 4,740,796 A | 4/1988 | Endo et al. ................... 346/1.1 |
| 4,758,461 A | 7/1988 | Akiya et al. ................. 428/212 |
| 4,785,313 A | 11/1988 | Higuma et al. ........... 346/135.1 |
| 4,832,984 A | 5/1989 | Hasegawa et al. .......... 427/161 |
| 4,877,680 A | 10/1989 | Sakaki et al. ............... 428/332 |
| 4,910,084 A | 3/1990 | Yamasaki et al. ......... 428/411.1 |
| 5,101,218 A | 3/1992 | Sakaki et al. ................. 346/1.1 |
| 5,122,814 A | 6/1992 | Endo et al. ................ 346/33 R |
| 5,126,010 A * | 6/1992 | Kobayashi et al. .......... 428/481 |
| 5,159,349 A | 10/1992 | Endo et al. ................ 346/33 A |
| 5,182,175 A | 1/1993 | Sakaki et al. ............. 428/537.5 |
| 5,266,383 A * | 11/1993 | Sakaki et al. ................ 428/195 |
| 5,338,597 A * | 8/1994 | Kurabayashi et al. ....... 428/195 |

\* cited by examiner

RECORDING MEDIUM

This application is a continuation of application Ser. No. 08/363,000, filed Dec. 23, 1994, now abandoned.

BACKGROUND OF THE INVENTION

1. Field of the Invention

The present invention relates to a recording medium, particularly to a modified recording medium suitable for ink-jet recording. The present invention also relates to an image forming method by ink-jet printing with the above recording medium.

2. Related Background Art

Ink-jet printing is attracting attention because it realizes higher speed recording, color recording, and higher density recording. Ink-jet recording apparatus are widely used. For the ink-jet recording, specially designed coated-paper have been used such as those disclosed in JP-A-59-35977 and JP-A-1-135682 ("JP-A" herein means Japanese Patent Laid-Open Application). Such specially designed coated-paper involves problems below, although it is suitable for formation of fine and sharp images.

1. Lack of touch-feeling of plain paper,
2. Low suitability for pencil writing,
3. Liableness of powder falling-off from the coat layer,
4. Less suitability for general purpose use, or insufficient suitability for other recording method, and
5. Higher cost in comparison with plain paper.

Furthermore, for office uses, recording on readily available inexpensive general purpose paper is desired for mono-color recording and business color recording, not on an exclusive paper according to a recording system.

The plain paper type recording medium currently used for electrophotographic copying in offices is toner-transfer paper (PPC paper) such as those disclosed in JP-A-51-13244, JP-A-59-162561, and JP-A-59-191068. Such paper is not sufficiently suitable for ink-jet recording.

For ink-jet recording, the aforementioned PPC paper involves problems below.

1. Insufficient ink absorbency, which retards drying and fixation of ink especially when a large amount of ink is applied (undried or unfixed ink image being liable to be impaired by contact with another article),
2. Feathering of ink being caused along paper fibers during absorption of ink into the paper layer, which causes spreading of recorded dots, and irregular or blurred dot periphery to provide unsharp recorded characters or recorded images,
3. Running of color at a border between different colors of images, and non-uniform mixing of different colors of inks in color printing in which a plurality of colors of inks are applied successively and overlappingly before drying of each color of ink, not giving desired image quality (hereinafter such phenomenon is called "bleeding"),
4. Insufficient water fastness of recorded image owing to use of a water-soluble recording agent, and
5. Insufficient coloring ability of the coloring agent on paper.

To solve the above problems, various measures are taken. For example, for improvement of water fastness of recorded images, an ink-jet recording paper containing a halogenated quaternary ammonium salt or the like substance is disclosed in JP-A-56-99693. Such water-fast ink-jet recording paper, however, has remarkably low light fastness and low ozone fastness disadvantageously. For improving the water fastness and light fastness, recording paper containing a polyallylamine salt is disclosed in JP-A-61-58788. This recording paper, which contains the polyallylamine salt only without a special coat layer, tends to cause low image density and ink bleeding. For the same purpose, a recording sheet containing a two- or higher valent water-soluble metal salt and an organic cationic substance is disclosed in JP-A-4-75140. Such a recording sheet is not necessarily sufficient in coloring property and water fastness.

For ink-jet recording, on the other hand, recording media other than paper are investigated and used. Examples thereof include a recording sheet having a porous ink receiving layer on a substrate, and a recording sheet having an ink-receiving layer comprising a water-soluble or hydrophilic polymer provided on a substrate. JP-A-60-220750 discloses a recording sheet having a hydrophilic coating film composed of a water-soluble polyvinyl alcohol of saponification degree of 70 to 90 molt % formed on a polyester film.

With the progress of performances of the ink-jet recording apparatus in recording speed, color printing, printing density, and so forth, the aforementioned recording sheets employing a plastic base other than paper are also required to have higher levels of properties to provide recording images of high resolution and high image quality similarly as recording paper, as below.

1. High ink absorbency to provide rapid drying and fixation of ink,
2. No bleeding, namely no flowing-out of ink to an adjacent ink dot, not to cause irregular mixing of the ink even when ink dots are formed adjacently,
3. No beading caused ("beading" means irregular optical density in a bead-like form caused by agglomeration of a dye on an ink receiving layer),
4. No excessive spreading of ink dot diameter caused by diffusion of an applied ink droplet on a recording sheet,
5. High image density formed by ink dots, and no blurring of periphery of recorded characters or images,
6. High coloring property of coloring component of ink,
7. High reproducibility of color, and high fineness of printed image,
8. High water fastness, and so forth.

Of the above required properties, water fastness is especially important. JP-A-1-190483 discloses an ink-jet recording sheet having improved water fastness of recorded images. Such disclosed types of recording sheets are not satisfactory in other ink-jet recording properties, e.g., ink-fixing properties, image density, sharpness of recorded images, etc.

SUMMARY OF THE INVENTION

The present invention intends to provide a recording medium, especially an ink-jet recording medium having the properties below:

1. Sufficient fixability for ink, and capability of giving excellent and high quality of characters,
2. Capability of giving sufficient image density and uniform solid print images,
3. No bleeding in color image formation,
4. Sufficient color reproducibility, and capability of giving sharp images in color image formation,
5. Capability of giving complete water fastness to recorded images, and so forth; and also intends to provide image forming method employing the recording medium.

The present invention further intends to provide a recording paper which has the above properties, has touch-feeling like plain paper, are useful commonly for various recording method including electrophotographic recording, thermal transfer recording, impact recording, and ink-jet recording, and are useful also for writing with a pencil, a felt pen, or a ball-point pen; and also intends to provide an image forming method employing the above recording paper.

The present invention still further intends to provide a recording medium employing a base material other than paper, and having the above-mentioned properties, and also intends to provide an image forming method employing the above recording sheet.

The objects mentioned above can be achieved by the present invention.

According to the present invention, there is provided a recording method for image formation on a recording medium by application thereon of an ink containing a water soluble dye having an anionic group or a cationic group, the recording medium comprising a substance having an ionic group counter to the anionic or cationic group of the water-soluble dye and having molecular weight of not higher than 1,000, and a polymeric substance having molecular weight of not lower than 2,000.

According to the present invention, there is still provided a recording medium of the present invention comprises a substance having molecular weight of not higher than 1,000 selected from the group consisting of organic cationic substances, basic polyaluminum chloride, and a basic aluminum salt of an organic acid; and a cationic polymeric substance having molecular weight of not less than 2,000.

According to the present invention there is further provided an image-forming method, comprising applying an ink containing at least a water-soluble dye having an anionic group in the molecule onto a recording paper medium specified above.

DETAILED DESCRIPTION OF THE PREFERRED EMBODIMENTS

Figure 1:
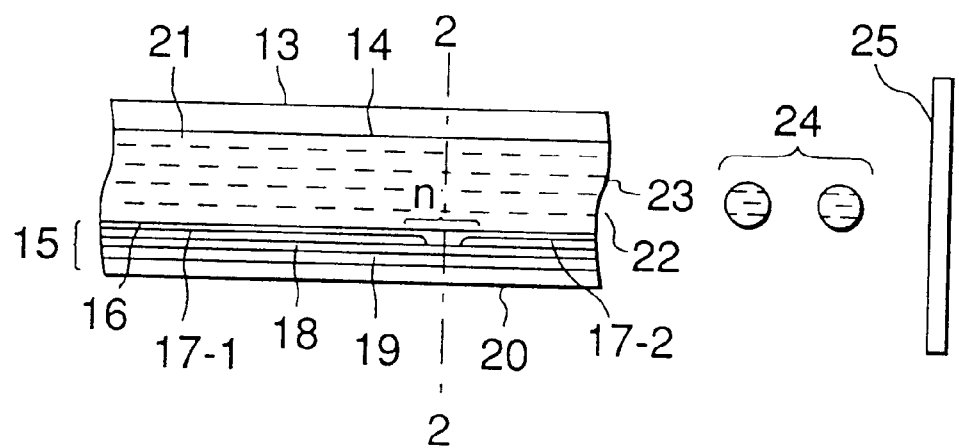
FIG. 1 is a vertical cross-sectional view of a printing head of an ink-jet printing apparatus.

On application of an ink onto a recording medium of the present invention, the applied ink is brought into contact with the cationic substance of molecular weight of not higher than 1,000 and the polymeric substance of molecular weight of not lower than 2,000, which are constituents of the recording medium, on the recording medium or a site where the ink has come to penetrate. Thereby, the dye (e.g., a dye having an anionic group) in the ink associates with the cationic substance of low molecular weight (molecular weight: 1,000 or lower) to separate instantaneously from the solution phase as the first step of the reactions.

Then the association product of the above dye and the above low molecular cationic substance is adsorbed onto a polymeric substance of molecular weight of 2,000 or higher contained in the recording medium, thereby the associated dye becoming a larger condensate in size, as the second step of the reactions.

Consequently, in the case where the recording medium is paper, the dye condensate is prevented from penetrating into fiber gaps or from migrating in the coat layer and only the separated liquid portion penetrates into the recording paper or the coat layer to give high recording quality and high fixability simultaneously. In the case where the recording medium is a recording sheet having an ink receiving layer provided on a plastic base material, the dye condensate is prevented from migration in the ink receiving layer, and only the separated liquid portion penetrates into the ink receiving layer to give high recording quality and high fixability simultaneously.

The aforementioned condensate of the low molecular cationic substance, the anionic dye, and the high molecular polymeric substance has a high viscosity, which retards the migration of the condensate and prevents mixing of different colors of inks of adjacent dots in full color recording, and occurrence of bleeding. The above condensate is inherently water-insoluble, whereby the water fastness of the formed image is complete. Furthermore, the light fastness of the recorded image is improved by the screening effect of the polymeric material of the condensate.

Furthermore, in the present invention, the cationic polymeric substance or a multi-valent metal salt is not used, or used only supplementarily in a smaller amount, differently from conventional technique. Consequently, the deterioration of the coloring properties of the dye can be avoided which could not be avoided when water fastness is achieved by use of a large amount of a cationic polymeric substance or a multivalent metal salt in conventional technique.

The components of the recording medium of the present invention are described below in more detail.

In case where anionic dye is used as a coloring material of ink, the recording medium of the present invention contains as the essential components:

(a) a low molecular cationic substance having a molecular weight not higher than 1,000, and (b) a polymer having molecular weight of not lower than 2,000.

The low molecular cationic substance, the component (a), associates with the dye, preferably a water-soluble dye having an anionic group, by ionic interaction. The rate of the association reaction is required to be high.

The low molecular cationic substance of molecular weight of 1,000 or lower as the component (a) includes organic cationic substances, basic polyaluminum chlorides, basic aluminum salts of an organic acid, and the like.

The organic cationic substances include primary, secondary, and tertiary amine salts such as hydrochlorides and acetates of laurylamine, coconut amine, stearylamine, and rosin amine; quaternary ammonium salts such as lauryltrimethylammonium chloride, lauryldimethylbenzylammonium chloride, benzyltributylammonium chloride, and benzalkonium chloride; pyridinium salts such as cetylpyridinium chloride, and cetylpyridinium bromide; imidazoline type cationic compounds such as 2-heptadecyl-hydroxyethylimidazoline; ethylene oxide adducts of higher alkylamine such as dihydroxyethylstearylamine; and the like.

The low molecular weight cationic substance as the component (a) includes also amphoteric surfactants which become cationic at a certain pH range, specifically including amino acid type amphoteric surfactant such as compounds of a type of R—NH—$CH_2$—$CH_2$—COOH, and carboxylate salt type amphoteric surfactants such as betaine type compounds, e.g., stearyldimethyl-betaine, lauryldihydroxyethylbetaine, etc.; and amphoteric surfactants of sulfate ester type, sulfonate ester type, and phosphate ester type. In use of such an amphoteric surfactant, it is necessary to adjust the formulation of the material of the recording medium to have a pH of the isoelectric point thereof or lower, or to show, when the recording medium is brought into contact with the ink, a pH of the isoelectric point or lower.

The aforementioned basic polyaluminum chloride is represented by the chemical formula of $[Al_2(OH)_nCl_{6-n}]^m$, which is a polymeric electrolyte comprising a polynuclear complex formed by polymerization of hydroxy aquo aluminum ion such as $\{Al(OH)_3\}20 \cdot AlCl_3$, $Al_4(OH)_9Cl_3$, $Al_2(OH)_5Cl \cdot nH_2O$, etc. The polyaluminum chlorides are soluble in water and exhibit higher cationic charge than monoatomic aluminum ion. Commercially available ones are Basic Polyaluminum Chloride (produced by Asada Chem. Co.), and Basic Polyaluminum Chloride (produced by Taki Chemical Co., Ltd.).

The basic polyaluminum chloride is preferably selected from the ones in which the values of m and n in the above chemical formulas are in the ranges of $0<m<100$ and $0<n<6$.

The aforementioned basic aluminium salts of organic acid is exemplified by basic aluminum lactate, which is a polymeric electrolyte represented by the chemical formula: $Al(OH)_{3-x}(CH_3CHOHCOO)_x \cdot nH_2O$, composed of a polynuclear complex derived by polymerization of hydroxy aquo aluminum ions. Such salts are water-soluble and are positively charged in water. In the present invention the range of x in the above chemical formula is in the range of $0<x<3$.

Aluminum compound used in the present invention which is the polymeric electrolyte gives, with a minimum amount thereof, sufficient water fastness of the recorded image with less decrease of dye coloring properties in comparison with a simple water-soluble metal salt.

The low molecular cationic substances having molecular weight of not higher than 1,000 useful in the present invention are mentioned above, but is not limited thereto. Of the above low molecular cationic substances, those having molecular weight ranging from 100 to 700 are preferred in view of the surface activity, reaction rate with the dye, and edge sharpness of the image.

The component (b), the polymeric substance having molecular weight of not lower than 2,000, of the recording medium of the present invention serves to adsorb the association product of the dye of the ink with the low molecular cationic substance to form a larger size of dye condensate to retard the migration thereof into the other constituents of the recording medium (e.g., gaps of the paper fibers and ink receiving layer), whereby the liquid component separates and penetrates into the recording medium to achieve the higher image quality and better ink fixation simultaneously as described above.

As the polymeric substance, the component (b), cationic polymeric substances are preferably employed. The cationic polymeric substance further retards the bleeding and improves the water fastness.

The cationic polymeric substances are exemplified by polyallylamine, polyallylamine hydrochloride, polyaminesulfone hydrochloride, polyvinylamine hydrochloride, chitosan acetate, and the like, but are not limited thereto. The salt form is not limited to hydrochlorides and acetates.

The polyallylamine is an olefin type of cationic linear polymer having primary amino groups ($—NH_2$) in the side chains, represented by the structural formula below, and is easily soluble in water and come to be positively charged in water.

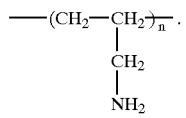

The polyallylamine salt is produced by polymerization of allylamine hydrochloride. The polyallylamine and the polyallylamine hydrochloride used in the present invention are distinguished in its property by pH of the aqueous solution. For example, an 1% by weight solution having pH of 7 or higher improves the coloring property of the coloring matter, and an 1% by weight solution having pH of 9 or higher improves both the coloring property and the ozone fastness of the recorded image.

The cationic polymeric substances further include partially cationized products of the aforementioned nonionic polymeric substances, specifically exemplified by copolymers of vinylpyrrolidone and quaternary aminoalkyl acrylate, copolymers of acrylamide and quaternary aminomethylacrylamide salt, but are not limited thereto.

The polymeric substances and the cationic polymeric substance as the component (b) are preferably water-soluble, but may be in a form of a dispersion like latex or emulsion.

Other components which are not essential but may be contained in the recording medium of the present invention are described below in detail.

A surfactant other than the above cationic substance may be incorporated in addition to the components (a) and (b). The incorporation of additional surfactant raises the image density and retard the bleeding in image formation in some kinds of inks. The surfactants specifically include higher alcohol-ethylene oxide adducts, alkylphenol-ethylene oxide adducts, fatty acid-ethylene oxide adducts, polyhydric alcohol fatty acid ester-ethylene oxide adducts, higher alkylamine-ethylene oxide adducts, fatty acid amide-ethylene oxide adducts, fat-ethylene oxide adducts, polypropylene glycol-ethylene oxide adducts, glycerol fatty acid esters, pentaerythritol fatty acid ester, sorbitol and sorbitan fatty acid esters, sucrose fatty acid esters, polyhydric alcohol alkyl ethers, fatty acid amides of alkanolamine, and so forth, but are not limited thereto. Of these, acetylene alcohol, acetylene glycol and their ethylene oxide adducts are particularly effective.

In the case where the components (a) and (b) are applied to the surface of the base material made of a sheet material composed of a fiber material and a filler, plastics, or the like, a binder for the components (a) and (b) may be employed. The binder is not limited to the materials which is soluble in or affinitive to the aqueous ink. Specific examples of the binder include synthetic polymers such as polyvinyl alcohols, polyurethanes, polyesters, polyacrylic acids (esters), polyvinylpyrrolidones, hydroxymethylcelluloses, hydroxyethylcelluloses, hydroxypropylcelluloses, carboxymethylcelluloses, polyethylene oxides, polyacetal resins, melamine resins, and modified products of the above polymers; natural resins such as albumin, gelatin, casein, starch, cationic starch, gum arabic, sodium alginate, and the like. Such binder materials may be used singly or in combination of two or more thereof.

The recording medium may further contain a pH adjusting agent, an antiseptic agent, an antioxidant, and the like, if necessary.

Various embodiments of the present invention are described below.

A first embodiment of the recording medium of the present invention is a recording paper sheet containing therein, or on the surface thereof, a low molecular cationic substance having molecular weight of not higher than 1,000 as the component (a), and a polymeric substance having molecular weight of not lower than 2,000 as the component (b).

Such a recording paper sheet is not so different from conventional neutral PPC paper sheets in the surface shape and the physical properties except for the recording characteristics, yet exhibits touch feeling of plain paper, and is useful both for toner transfer-receiving paper sheets for electrophotographic copying and to recording paper sheets for ink-jet recording. Such a recording paper sheet exhibits the effects resulting from the above components (a) and (b) and combination thereof with a specific recording liquid, and is advantageous in touch-feeling like plain paper, suitability for pencil writing, and decreased powder falling-off from a coat layer.

This type of recording paper sheet is prepared by impregnating a sheet material composed of a fiber material and a filler with the aforementioned cationic substance (component (a)) and the aforementioned polymeric substance (component (b)), or by applying the cationic substance and the polymeric substance onto a sheet material composed of a fiber material and a filler.

In the above embodiment of the recording paper sheet of the present invention, the amounts of the components (a) and (b) are selected suitably depending on the kinds of the compounds for the respective components. The total amount of the two components is preferably in the range of from 0.05 to 7 g/m$^2$. With the amount of less than 0.05 g/m$^2$, the above-described effects tends not to be achieved, while, with the amount of more than 7 g/m$^2$, the recording sheet tends to have lower ink absorbency, to be not improved in bleeding, and to have lower light fastness. The total amount of the components (a) and (b) is desirably in the range of from 0.3 to 3 g/m$^2$ for remarkable improvement in bleeding prevention, light fastness and image density.

The ratio of the component (a) to the component (b) is in the range of from 100:1 to 1:20 by weight. With a larger amount of the component (a) than the ratio of 100:1, the water fastness tends to become insufficient, while, with a larger amount of the component (b) than the ratio of 1:20, the image density tends to become lower, and the prevention of bleeding tends to be insufficient. The desirable ratio of the components (a) to (b) is in the range of from 5:1 to 1:20 by weight.

The ratio of the basic polyaluminum chloride to the polymeric substance is preferably in the range of from 8:2 to 0.5:9.5, more preferably from 5:5 to 1:9 by weight. With a larger amount of basic polyaluminum chloride than the above ratio, the water fastness is slightly lower, while, with a larger amount of the polymer than the above ratio, the water fastness and the image quality are slightly lower in the above embodiment of the recording medium. The reasons are considered as below. A larger amount of the basic polyaluminum chloride has an excessive number of molecules for quickly reacting (or associating) with the dye molecules, resulting in less chance of reaction of the polymeric substance molecules with the dye molecules or its association product, retarding the formation of condensate of the association product to lower the water fastness. On the other hand, a smaller amount of the basic polyaluminum chloride is insufficient for the rapid reaction of the dye molecules with the polymeric substance, resulting in penetration of unreacted dye molecules into the paper layer to give insufficient water fastness.

By the same reason, the ratio of the basic aluminum lactate to the polymeric substance is in the range of from 10:0 to 0.5:9.5, more preferably from 8:2 to 1:9 by weight.

The above recording paper sheet is made from chemical pulp such as LBKP and NBKP, a sizing agent (internal sizing or surface sizing), and a filler as the main constituents, and other optional additives by a conventional paper-making process.

The pulp material may be chemical pulp combined with mechanical pulp or waste paper regeneration pulp, or may be mainly composed of the latter.

The sizing agent (internal sizing agent) includes rosin size, alkylketene dimer, alkenylsuccinic anhydride, petroleum resin type size, epichlorohydrin, acrylamide, and the like.

The filler includes calcium carbonate, kaolin, talc, titanium dioxide, and the like.

The surface sizing agent (or a coating agent) includes casein, starch, cellulose derivatives, e.g., carboxymethylcellulose, hydroxymethylcellulose, etc., hydrophilic resins, e.g., polyvinyl alcohol, polyvinylpyrrolidone, sodium polyacrylate, polyacrylamide, etc., which have swelling properties to the ink; resins having a hydrophilic moiety and a hydrophobic moiety in the molecule, e.g., SBR latex, acrylic emulsion, styrene/acrylate copolymers etc.; water-repelling substances, e.g., silicone oil, paraffin, wax, fluorine compounds, etc.; and the previously mentioned internal sizing agents.

The recording paper of the present invention is adjusted to exhibit a water-extract pH value of 6 or higher, preferably 7 or higher. This water-extract pH value is measured by immersing about 0.1 g of a test piece specified in JIS-P-8133 in 70 ml of distilled water, and measuring the pH of the extract water according to JIS-Z-8802. The paper which exhibits the water-extract pH outside the above range may have poor storability in long term, and may impair the complete color-development of the dye on the paper sheet.

The recording paper sheet of the present invention has a Stoeckigt sizing degree of preferably from 0 to 40 seconds. The paper sheet having an extremely high Stoeckigt sizing degree requires long time for absorbing the ink into the paper layer to retard the fixation and drying of the attched ink. Therefore the sizing degree is preferably within the above range.

The recording paper sheet of the present invention is made from the aforementioned materials. The low-molecular cationic substance as the component (a) and the polymeric substance as the component (b) are incorporated in a suitable amount to the sheet comprising a fiber material like pulp and a filler. The incorporation of the components (a) and (b) into the sheet is conducted by impregnation, or application on the surface of the sheet material.

The recording paper sheet of the present invention has preferably a final basis weight in the range of from 50 to 150 g/m$^2$. At the basis weight of below 50 g/m$^2$, strike-through of the ink and cockling are liable to occur, and at the basis weight of above 150 g/m$^2$, the feeding property of the paper sheet tends to be lowered.

The recording paper sheet mainly composed of a fiber material and a filler of the present invention may contain additionally a conventional pigment in a suitable amount, in order to improve further the properties of resolution of the recorded image, in addition to the cationic substance (component (a)), the polymeric component (component (b)), and other optional additives.

In this case, to provide touch-feeling like plain paper, the surface of the recording sheet is preferably in such a state that the fiber material constituting the sheet is coated by the pigment particles and partially the fiber material is exposed at the surface. Specifically, the cationic substance, the polymeric substance, and a filler are impregnated in the sheet material or applied on the surface thereof in a suitable amount to the sheet material composed of a fiber material and a filler, and the fiber material is covered by the pigment particles, and is partially exposed on the surface.

The above pigment may be a mixture of an inorganic pigment and an organic pigment. The inorganic pigment includes silica, alumina, aluminum silicate, magnesium silicate, hydrotalcite, calcium carbonate, titanium oxide, clay, talc, basic magnesium carbonate, and the like, but are not limited thereto. The organic pigment includes plastic pigment such as urea resins, urea-formalin resins, polyethylene resins, polystyrene resins, and the like, but is not limited thereto.

The pigment is applied on the recording surface in an amount of from 0.1 to 5 g/m$^2$.

In production of the recording paper sheet containing the above pigment, an aqueous coating liquid is prepared which contains the pigment, the cationic substance, the polymeric substance, a binder, and another additives. The coating liquid is impregnated or applied onto the surface of the sheet material composed of a fiber material and a filler by a conventional coating method such as roll coating, blade coating, air knife coating, gate roll coating, size press coating, and simusizer coating. Then the applied liquid is dried by an air drying furnace, a hot drum, or the like to obtain a recording paper sheet having a desired surface shape. The paper sheet may further be supercalendered to smoothen the surface or to raise the surface strength of the sheet.

The basic aluminum lactate, which is employed in the present invention, changes the cationic charge number depending on the pH of the coating liquid. The preferred pH of the coating liquid is in the range of not higher than 12.0. At the pH above 12.0, the coating liquid has high viscosity and comes to gel. More preferably the pH is not higher than 7.0. At the pH above 7.0, aluminum hydroxide may begin to precipitate depending on the conditions.

A second embodiment of the present invention is a recording sheet having an ink receiving layer formed on a base material other than paper, such as a plastic film, by applying on the surface of the base material the aforementioned essential component (a), a low-molecular cationic substance of molecular weight of 1,000 or lower, and the essential component (b), a polymeric substance having molecular weight of not lower than 2000, and additional optional components such as a binder, and a surfactant. Such a sheet also exhibits the effects of the combination of the above components (a) and (b), and is especially suitable for ink-jet recording.

In this recording sheet of the second embodiment, the amount of the ink receiving layer, namely the coating amount, is in the range of preferably from 0.2 to 50 g/m$^2$, more preferably from 1 to 30 g/m$^2$ in total for one surface of the plastic base material. With the coating amount below 0.2 g/m$^2$, the ink absorbency is insufficient, which may cause incomplete drying or bleeding of the ink, while, with the coating amount above 50 g/m$^2$, the recording sheet may curl or the coating layer may exfoliate. The above preferred coating amount corresponds to the thickness in the range of from 0.05 to 100 $\mu$m.

In this embodiment, the ratio of the components (a) to (b) is preferably from 20:1 to 1:20 by weight. With a larger amount of the component (a) than the above ratio of 20:1, running of the image is liable to be caused under high temperature and high humidity to deteriorate the sharpness of the image, while, with a larger amount of (b) than the above ratio of 1:20, the image sharpness is liable to be impaired by drop of the image density or occurrence of bleeding.

The respective amounts of the components (a) and (b) are selected suitably depending on the kinds of the compounds employed. The total amount of the two component is preferably in the range of from 0.005 to 70% by weight of the ink receiving layer. With the amount below 0.005% by weight, the effects of the two components are liable to be impaired, while, with the amount above 70% by weight, the light fastness is liable to be impaired. The most desirable amount of the components ((a) and (b) in total) is in the range of from 0.01 to 30% by weight of the ink receiving layer.

The recording sheet may contain a filler similar to that employed in the aforementioned recording paper sheet to improve antiblocking properties and feeding property thereof. The filler includes silica, alumina, aluminum silicate, magnesium silicate, basic magnesium carbonate, talc, clay, hydrotalcite, calcium carbonate, titanium oxide, zinc oxide, and plastic pigments composed of polyethylene, polystyrene, and polyacrylate, but is not limited thereto.

Further additives may be added including a dispersant, a fluorescent color developer, a pH adjusting agent, an antiseptic agent, an antioxidant, a penetrating agent, a water-resisting agent, an antifoaming agent, a UV absorbing agent, a viscosity adjusting agent, a plasticizer, etc. These additives may be selected suitably from known compounds depending on the object.

The plastic material for the base material of the above recording sheet includes polyethylene terephthalates, diacetates, triacetates, cellophane, celluloid, polycarbonates, polyimides, polyvinyl chlorides, polyvinylidene chlorides, polyacrylates, polyethylenes, polypropylenes, and the like. The plastic material is suitably selected depending on the conditions such as the object of the use of the recording medium, use of the image, adhesiveness of the base material with the composition constituting the ink receiving layer.

In production of the aforementioned recording sheet, a coating liquid is prepared which contains the cationic substance, the polymeric substance, a binder and other additives, and the coating liquid is applied on the surface of a base material by a conventional method such as roll coating, blade coating, air knife coating, gate roll coating, bar coating, spray coating, slit coating, gravure coating, and curtain coating. The applied matter is dried by an air drying furnace, a hot drum, or the like to obtain a desired recording sheet.

Still another embodiment of the present invention is a recording sheet which has an ink receiving layer, formed on a smooth plate such as a glass plate, containing the essential component (a), namely a low molecular cationic substance of molecular weight of not higher than 1,000, the essential component (b), namely a polymeric substance of molecular weight of not lower than 2,000, and aforementioned other additives such as a binder, and a surfactant according to the same coating method as employed in layer formation on the plastic base material.

The recording medium having an ink receiving layer on a plastic film or a glass plate has a total basis weight in the range of from 50 to 5,000 g/m$^2$.

Next, the image forming method of the present invention is described below in detail.

The image forming method of the present invention is characterized by use of the above-described recording medium. The ink for the image formation contains preferably a water-soluble dye having an anionic group. The ink is composed of the water-soluble dye having an anionic group, and generally water, a water-soluble organic solvent, and optionally other additives such as a viscosity adjusting agent, a pH adjusting agent, an antiseptic agent, a surfactant, an antioxidant, and the like.

The anionic group-containing water-soluble dye may be any acid dye, direct dye, or reactive dye listed in COLOR INDEX, but is not limited thereto. Any dye having an anionic group, such as a sulfo group and a carboxylic group, may be used even if it is not listed in COLOR INDEX. The water-soluble dye mentioned here includes those which having a solubility dependent on pH.

The water-soluble organic solvent includes amides such as dimethylformamide, and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, hexylene glycol, and diethylene glycol; 1,2,6-hexanetriol, thiodiglycol, lower alkyl ethers of polyhydric alcohol such as ethylene glycol methyl ether, diethylene glycol monomethyl ether, and triethylene glycol monomethyl ether; monohydric alcohols such as ethanol, isopropyl alcohol, n-butyl alcohol, and isobutyl alcohol; and glycerin, N-methylpyrrolidone, 1,3-dimethylimidazolidinone, triethanolamine, sulfolane, dimethyl sulfoxide, and the like. The above water-soluble organic solvent is contained in the ink at a content of preferably from 1 to 50% by weight, more preferably form 2 to 30% by weight.

The ink may further contain optionally an additive such as viscosity-adjusting agent, a pH-adjusting agent, an antiseptic agent, an amphoteric surfactant, an antioxidant, an evaporation-promoting agent, and the like. The selection of the surfactant is particularly important in adjusting the permeation properties of the liquid.

The preferred physical properties of the above ink at 25° C. is as follows: pH of from 3 to 12; surface tension of from 10 to 60 dyn/cm, preferably from 10 to 40 dyn/cm; and viscosity of from 1 to 30 cP.

To obtain higher effects of the present invention, the ink may further contain an anionic surfactant or anionic polymeric substance, or the aforementioned amphoteric surfactant may be used at a pH higher than its isoelectric point. The anionic surfactant includes those of carboxylic types, sulfate ester types, sulfonate salt types, phosphate ester types, and other ordinary surfactants, which are useful without any adverse effects. The anionic polymeric substance includes alkali-soluble resins such as sodium polyacrylate, and copolymers having acrylic acid unit partially, but is not limited thereto.

In the above description, the image forming method of the present invention is described mainly specifically regarding the ink containing a water-soluble dye having an anionic group. However, the image forming method of the present invention is also practicable with an ink containing a water-soluble dye having a cationic group such as a basic dye.

With the cation type ink, the same effects can be achieved by use of a recording medium containing at least an anionic substance having molecular weight of not higher than 1,000, and an anionic polymeric substance having molecular weight of not lower than 2,000.

The anionic substance is exemplified by an anionic surfactant such as those of carboxylic types, sulfate ester types, sulfonate salt types, phosphate ester types, and the like.

The anionic polymeric substance is exemplified by alkali-soluble types of resins such as sodium polyacrylate, and copolymers having acrylic acid unit partially.

The image forming method of the present invention is applicable to general recording system, particularly to ink-jet printing. Any known ink-jet printing system may employed which ejects droplets of an ink from an orifice to apply ink onto the recording medium. An example of the effective ink-jet printing method is disclosed in JP-A-54-59936, in which thermal energy is given to the ink to cause abrupt change of the volume of the ink and to eject ink from an orifice by the phase change energy.

Figure 2:
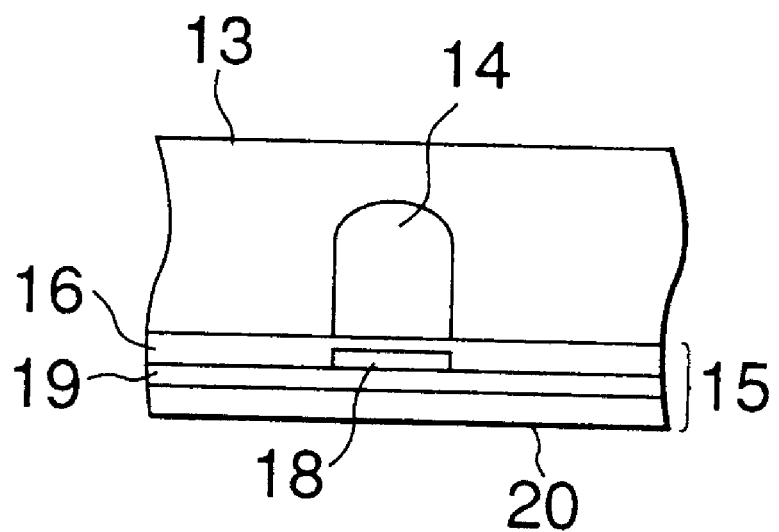
FIG. 2 is lateral cross-sectional view of a printing head of an ink-jet printing apparatus.
Figure 3:
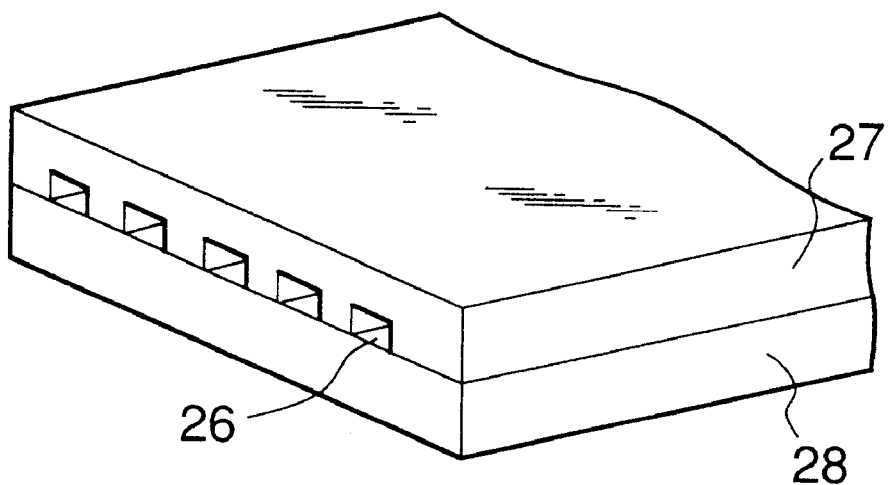
FIG. 3 is a perspective external view of a printing head of an ink-jet printing apparatus.

An example of ink-jet printing apparatus which is suitable for ink-jet printing of the present invention is explained by reference to the drawings. FIGS. 1, 2, and 3 illustrates an example of the construction of a head which is the essential part of the apparatus.

FIG. 1 is a sectional view of the head 13 along the ink flow path, and FIG. 2 is a sectional view taken at the line 2—2 in FIG. 1.

In these drawings, a head 13 is constructed by bonding a plate of glass, ceramics, or plastics having grooves 14 for ink flow with a heat-generating head 15 for thermal printing. (The heat-generating head is not limited to the thin film head shown in the drawings.) The heat-generating head 15 is constituted of a protection layer 16 formed from silicon oxide or the like; aluminum electrodes 17-1, 17-2; a heat-generating resistance layer 18 made of nichrome or the like; a heat-accumulating layer 19; and a heat-radiating substrate plate 20 made of alumina or the like.

The ink 21 fills an ejection orifice (fine nozzle) 22, and has a meniscus 23 formed by a pressure P.

On application of an electric signal information to the electrodes 17-1, 17-2 of the head, the region denoted by a symbol "n" on the heat-generating head 15 generates heat abruptly to form bubbles in the ink 21 on that region, the pressure of the bubble pushes out the meniscus 23 to eject the ink 21 from the orifice 22 in a shape of droplets 24. The ejected ink droplets travel toward a recording medium 25.

FIG. 3 shows a external appearance of a multiple head integrating a plurality of heads shown in FIG. 1. The multiple head is formed by bonding a glass plate 27 having multiple grooves 26 with the heat-generating head 28 like the one shown in FIG. 1.

Figure 4:
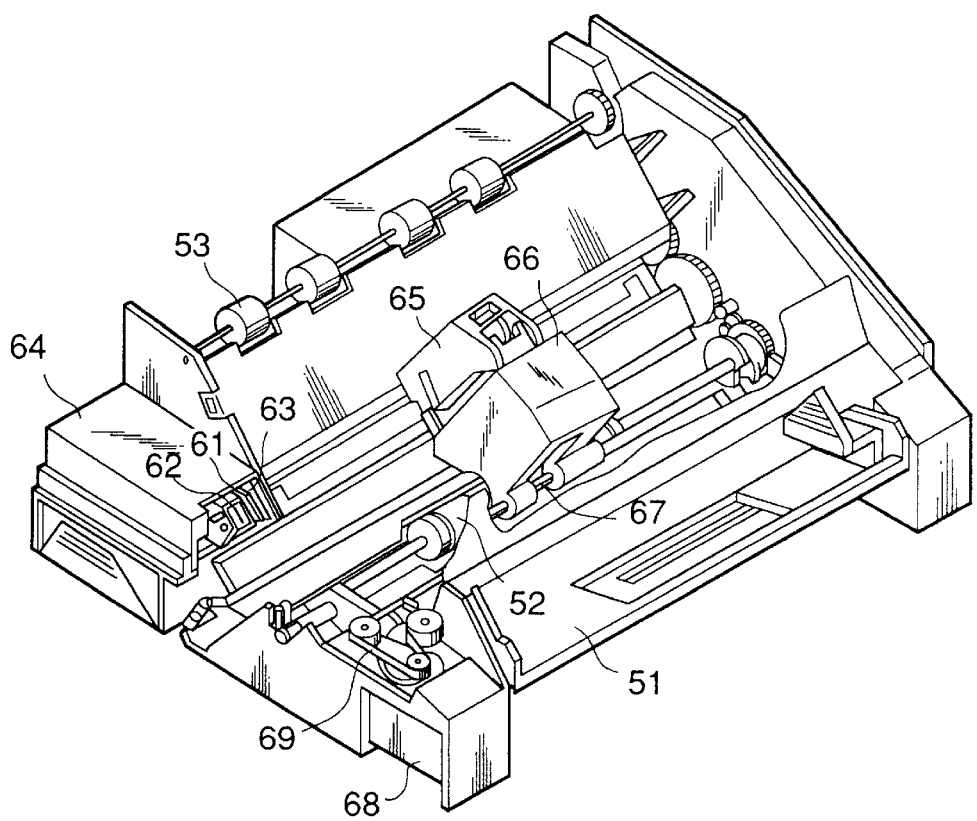
FIG. 4 is a perspective external view of an ink-jet printing apparatus.

FIG. 4 shows an example of the entire of the ink-jet recording apparatus equipped with the above-described head. In FIG. 4, a blade 61 as a wiping member is held at one end of the blade by a blade-holding member, forming a fixed end in a shape of a cantilever. The blade 61 is placed at a position adjacent to the recording region of the recording head, and, in this example, is held so as to protrude into the moving path of the recording head. The cap 62 is placed at a home position adjacent to the blade 61, and is constituted such that it moves in the direction perpendicular to the moving direction of the recording head to come into contact with the ejection nozzle face to cap the nozzle. An ink absorbent 63 is placed at a position adjacent to the blade 61, and is held so as to protrude into the moving path of the recording head in a manner similar to that of the blade 61. The blade 61, the cap 62, and the absorbent 63 constitute an ejection recovery device 64. The blade 61, and the absorbent 63 serve to remove off water, dust, and the like from the face of the ink ejection nozzle.

A recording head 65 has an energy-generating means for the ejection, and conducts recording by ejecting the ink onto a recording medium opposing to the ejection nozzle face. A carriage 66 is provided for supporting and moving the recording head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto.

A paper delivery device 51 for delivery of a recording medium and a paper delivery roller 52 driven by a motor (not shown in the drawing) delivers a recording medium to the position opposing to the ejection nozzle face of the recording head, and the recording medium is delivered with the progress of the recording to a paper discharge device provided with paper-discharging rollers 53.

In the above constitution, when the recording head 65 returns to the home position on completion of recording, the cap 62 of the ejection-recovery device 64 is positioned out of the moving path of the recording head 65, and the blade 61 is allowed to protrude to the moving path. Thereby, the ejecting nozzle face of the recording head 65 is wiped. To cap the ejection face of the recording head 65, the cap 62 protrudes toward the moving path of the recording head to come into contact with the ejection nozzle face.

When the printing head 65 is made to move from the home position to the print-starting position, the cap 62 and the blade 61 are at the same position as in the above-mentioned wiping step, so that the ejection nozzle face of the recording head 65 is wiped also in this movement.

The printing head is moved to the home position not only at the completion of the printing and at the time of ejection recovery, but is also moved at a predetermined intervals during printing from the recording region. The nozzle is wiped by such movement.

For color recording, four printing heads which contains respectively inks or black, cyan, magenta, or yellow are juxtaposed in parallel on the carriage 66, or one recording head is divided vertically into four sections. Three colors of inks, cyan, magenta, and yellow, may be used in place of the four colors.

The present invention is described below in more detail by reference to Examples. These Examples are shown for easy understanding of the present invention without limiting the invention. In Examples, the units "part" is based on weight.

EXAMPLE 1

Preparation of Recording Paper Sheet

As the pulp material, 90 parts of LBKP, 10 parts of NBKP were mixed, and were subjected to beating. Thereto, were added 10 parts of kaolin (produced by Tsuchiya Kaolin Co.), 0.2 parts of alkenylsuccinic anhydride, and 5 parts of cationic starch. From this mixture, a base paper sheet (P-1) was produced in the conventional manner. The resulting base paper sheet had a basis weight of 70 g/m$^2$, and a Stbckigt sizing degree of 23 seconds.

This base paper sheet was impregnated a solution (M-1) prepared by mixing and dissolving the components below. After draining off an excess solution, the paper sheet was dried in an oven at 120° C. for one minute to obtain a recording paper sheet. The solution was applied to the base paper sheet so as to make a dry coated amount of 2.5 g/m$^2$. (Composition of M-1):

- 1.5 part of a cationic compound (Benzyltributylammomonium chloride, BTBAC, trade name, a product of Sanyo Chemical Co.);
- 0.05 part of a polymeric compound (Polyacrylamide, Sanflock N-500P, trade name, a product of Sanyo Chem. Co.);
- balance of water up to 100 parts.

Preparation of Ink

The components below were mixed, and the resulting solutions were filtered through a membrane filter having a pore size of 0.22 μm (trade name: Fluoropore Filter, produced by Sumitomo Electric Industries, Ltd.) to prepare a yellow ink (1)-Y, a magenta ink (1)-M, a cyan ink (1)-C, and a black-ink (1)-K. In the component ratios below, the total amount of each ink was 100 parts.

Yellow Ink (1)-Y:

2 parts of C.I. Direct Yellow 86 (dye), 10 parts of thiodiglycol, 0.05 part of Acetylenol EH, and balance of water.

Magenta Ink (1)-M:

The dye was replaced by 2.5 parts of C.I. Acid Red 289 in the ink (1)-Y.

Cyan Ink (1)-C:

The dye was replaced by 2.5 parts of C.I. Acid Blue 9 in the ink (1)-Y.

Black Ink (1)-K:

The dye was replaced by 3 parts of C.I. Food Black 2 in the ink (1)-Y.

Image Formation

With the above recording paper sheet and the above inks, a color image was printed by an ink-jet printing apparatus provided with an ink-jet printing head which has 14 printing nozzles per mm and ejects ink droplets by an action of heat. The printed image was evaluated for the items below:

1. Image Density:

A solid print image of 100%-duty was formed with the black ink. After left standing for 12 hours, the printed image was subjected to reflection density measurement by means of a reflection densitometer (MacBeth RD-918, manufactured by MacBeth Co.).

2. Resistance to Bleeding:

Solid print images of 100%-duty, 200%-duty, and 300%-duty were printed adjacently. The degrees of the bleeding at the borders between the respective color portions were observed visually. Resistance to bleeding was ranked as A where there is no problem in practical use, and B which was other than A.

3. Water Fastness:

Onto a printed character of 100%-duty, one drop of water was put by a dropping pipet, and the water was dried spontaneously. After drying, the printed character was observed visually. Water fastness was ranked as A where neither running nor bolding of (growing wide in) the printed characters was recognized, B where no running of images was caused but bolding of the recorded characters was recognized, and C which was other than A and B. The evaluation results are shown in Table 1.

EXAMPLE 2

10 parts of starch was further added to the solution M-1 for increasing a viscosity of the solution. The resulted viscous solution was applied to the base paper sheet P-1 mentioned above so as to make a dry coated amount of 1.5 g/m$^2$ by a bar coater to obtain a recording paper sheet. Thereafter, image forming was performed to the recording paper sheet using the same ink with the same procedure under the same conditions as in Example 1. Recorded images were evaluated as same as in Example 1. Results are shown in Table 1.

EXAMPLE 3

The base paper sheet P-1 mentioned above was impregnated with the solution M-2 prepared from the following components and an excess water content was removed, and the paper was dried in an oven at 120° C. for 1 minute to obtain a recording paper sheet. At this time, the solution was applied to the base paper sheet so as to make a dry coated amount of 2.5 g/m².

(Composition of M-2):

1.5 part of a cationic compound (Benzyltributylammomonium chloride, BTBAC, trade name, a product of Sanyo Chemical Co.);

0.05 part of a polymeric compound (Polyacrylamide, Sanflock N-500P, trade name, a product of Sanyo Chem. Co.);

0.5 part of a surfactant (Acetylene glycol-EO adduct, Acetylenol EH, trade name, a product of Kawaken Fine Chem. Co.); and balance of water up to 100 parts.

To the recording paper sheet, image forming was performed with the same printing procedure and under the same conditions as in Example 1. Recorded images were evaluated as same as in Example 1. Results are shown in Table 1.

EXAMPLE 4

10 parts of starch was further added to the solution M-2 for increasing a viscosity of the solution. The resulted viscous solution was applied to the base paper sheet P-1 mentioned above so as to make a dry coated amount of 1.5 g/m² by a bar coater to obtain a recording paper sheet. Thereafter, image forming was performed to the recording paper sheet using the same ink with the same printing procedure and under the same conditions as in Example 1. Printed images were evaluated as same as in Example 1. Results are shown in Table 1.

EXAMPLES 5 to 13

The solutions having compositions as shown in Table 3 were prepared from components-shown in Table 2. Each of the base paper sheets P-1 mentioned above was impregnated with the same solutions as in Example 1 to obtain recording paper sheets (each solution was applied to the base paper sheet so as to make a dry coated amount of 2.5 g/m²). To each recording paper sheet, image forming was performed using one of inks as shown in Table 3, with the same printing procedure and under the same conditions as in Example 1. Printed images were evaluated as same as in Example 1. The inks in Table 3 contained the same components as in Example 1, except other components set forth in Table 3. The amount of water in the solutions or inks was adjusted so as to make up 100 parts in total. Results are shown in Table 1.

COMPARATIVE EXAMPLE 1

Printing was performed to the base paper sheet P-1 (not impregnated with solution M-1) using the same ink with the same printing procedure and under the same conditions as in Example 1, and the printed characters were evaluated as same as in Example 1. Results are shown in Table 1.

COMPARATIVE EXAMPLE 2

The base paper sheet P-1 was impregnated with a solution, in which a cationic compound was eliminated from the solution M-1, containing only a polymeric compound and water, (each solution was applied to the base paper sheet so as to make a dry coated amount of 2.5 g/m²) to obtain a recording paper sheet. To the recording paper sheet, printing was performed using the same ink with the same printing procedure and under the same conditions as in Example 1, and the printed characters were evaluated as same as in Example 1. Results are shown in Table 1.

As clear from the results of Examples 1 to 13 in Table 1, images superior in an image density, a resistance to bleeding and a water fastness could be obtained. On the contrary, in Comparative Examples 1 and 2, only images having a low image density and a poor resistance to bleeding could be obtained, and a water fastness of images was also inferior.

The recording paper sheets of Examples 1 to 13 had all a touch-feeling like a plain paper, and were superior in a printing property with a pencil. Furthermore, no dusting occurs in all the cases, in particular in the paper sheets in Examples 2 and 4.

TABLE 1

| | Evaluation Items | | |
|---|---|---|---|
| | Image density | Resistance to bleeding | Water fastness |
| Comparative Example 1 | 1.00 | B | C |
| Comparative Example 2 | 0.80 | B | B |
| Example 1 | 1.16 | A | B |
| Example 2 | 1.17 | A | B |
| Example 3 | 1.16 | A | B |
| Example 4 | 1.17 | A | B |
| Example 5 | 1.18 | A | B |
| Example 6 | 1.10 | A | A |
| Example 7 | 1.08 | A | A |
| Example 8 | 1.16 | A | B |
| Example 9 | 1.19 | A | B |
| Example 10 | 1.23 | A | B |
| Example 11 | 1.24 | A | A |
| Example 12 | 1.27 | A | B |
| Example 13 | 1.27 | A | A |

TABLE 2

| Classification of compounds | Trade name/ manufacturer | Structure |
|---|---|---|
| Low molecular cationic substance | G-50/ Sanyo Chem. Co. | Benzalkonium chloride |
| Polymeric substance | Kohnanflock K-126/ Kohnan Chem. Co. | Polyacrylamide |
| Polymeric substance | Sanflock/ Sanyo Chem. Co. | Polyacrylamide |
| Polymeric substance | PAS-92/ Nitto Boseki Co. | Polyamine sulfone (MW = 5,000) |
| Cationic polymeric substance | PAA-HCl-3L/ Nitto Boseki Co. | Polyallylamine hydrochloride (MW = 10,000) |
| Cationic polymeric substance | PAS-120/ Nitto Boseki Co. | Polyamine sulfone (MW = 100,000) |
| Anionic surfactant | Emal D/ Kao Co. | Sodium lauryl sulfate |

TABLE 3

| | Solution to be impregnated into recording paper | | Ink Component |
|---|---|---|---|
| | Low molecular cationic compound | Polymeric compound | other than dye, water and solvent |
| Example 5 | BTBAC (1.5) | K-126 (1.5) | same as Ex. 1 |
| Example 6 | BTBAC (1.0) | K-126 (1.0)/ PAA-HCl-3L (1.0) | same as Ex. 1 |

TABLE 3-continued

| | Solution to be impregnated into recording paper | | Ink Component |
|---|---|---|---|
| | Low molecular cationic compound | Polymeric compound | other than dye, water and solvent |
| Example 7 | BTBAC (1.0) | K-126 (1.0)/ PAS-120 (1.0) | same as Ex. 1 |
| Example 8 | G-50 (1.5) | same as Ex. 5 | same as Ex. 1 |
| Example 9 | G-50 (1.2) | same as Ex. 5 | Emal D (1.0) |
| Example 10 | G-50 (5.0) | Sanflock 700 (1.0) | same as Ex. 1 |
| Example 11 | G-50 (4.0) | Sanflock 700 (1.0)/PAS-92 (1.0) | same as Ex. 1 |
| Example 12 | G-50 (3.0) | same as Ex. 10 | same as Ex. 9 |
| Example 13 | G-50 (3.0) | same as Ex. 11 | same as Ex. 9 |

Note:
The figures in the parentheses are an amount added (% by weight).

EXAMPLE 14

Preparation of Recording Paper Sheet

As a pulp, 90 parts of LBKP, 10 parts of NBKP were mixed and beated, and then 10 parts of kaolin (produced by Tsuchiya Kaolin Co.), 0.2 part of alkenyl succinic anhydride, 0.3 part of a cationized starch were incorporated. A base paper sheet (P-2) having a basis weight of 72 g/m$^2$ and a Stöckigt sizing degree of 10 seconds was made by a conventional paper-making process.

To the base paper sheet, a solution (M-3) prepared from the following components was impregnated. The solution was applied so as to make a dry coated amount of 2 g/m$^2$ by means of a bar coater, and after drying a recording paper sheet was obtained.
(Composition of M-3)
   7 parts of pulverized silica (Sylysia 470, trade name, a product of Fuji Silysia Co.);
   7 parts of polyvinyl alcohol (Gohsenol NL-06, trade name, a product of Nihon Gohsei Chemical Co.);
   7 parts of a cationic compound (Benzyltributylammomonium chloride, BTBAC, trade name, a product of Sanyo Chemical Co.);
   0.3 part of a polymeric compound (Polyacrylamide, Sanflock N-500P, trade name, a product of Sanyo Chemical Co.); and
   79 parts of water.

To the thus obtained recording paper sheet, image forming was performed (printed) using the same ink with the same printing procedure and under the same conditions as in Example 1. Printed images were evaluated on items of (1) Image density and (3) Water fastness as same as in Example 1. Resistance to bleeding and light fastness were evaluated as follows.
(2) Resistance to Bleeding:
   Solid print images of black, yellow, magenta, cyan, blue, green and red were printed adjacent to each other and a degree of bleeding at each boundary of colors was observed visually. The resistance to bleeding was ranked as AA where the boundary could be recognized as a straight line, A where the boundary was clear, but not straight a little, C where the boundary could be recognized due to mixing of inks, or B which was placed in the middle between A and C.
(4) Light Fastness:
   A solid print of magenta was prepared and an Xenon lamp light was irradiated to the samples using Atlas fade-o-meter Ci-35 for 30 hours, as an accelerating test of evaluation of light fastness of the print. A ratio of an image density after irradiation to that before irradiation was measured. A sample having a larger ratio was of a better light fastness. Results are shown in Table 4.

EXAMPLE 15

The base paper sheet P-2 above was impregnated with the solution (M-4) prepared from the following components. The solution was applied so as to make a dry coated amount of 2 g/m$^2$ by means of a bar coater, and after drying a recording paper sheet was obtained.

To the thus obtained recording paper sheet, image forming was performed using the same ink with the same printing procedure and under the same conditions as in Example 14. Printed images were evaluated as same as in Example 14. Results are shown in Table 4.
(Composition of M-4):
   7 parts of pulverized silica (Sylysia 470, trade name, a product of Fuji Silysia Co.);
   7 parts of polyvinyl alcohol (Gohsenol NL-06, trade name, a product of Nihon Gohsei Chemical Co.);
   5.3 parts of a cationic compound (Benzyltributylammomonium chloride, BTBAC, trade name, a product of Sanyo Chemical Co.);
   0.3 part of a polymeric compound (Polyacrylamide, Sanflock N-500P, trade name, a product of Sanyo Chemical Co.);
   0.5 part of a surfactant (Acetylene glycol-EO adduct, Acetylenol, trade name, a product of Kawaken Fine Chemical Co.); and
   79 parts of water.

EXAMPLES 16 to 24

The base paper sheet P-2 above was impregnated with solution (M-X) prepared from the following components. The solutions (M-16) through (M-24) were applied each so as to make a dry coated amount of 3 g/m$^2$ each by a bar coater, and after drying, recording paper sheets according to Examples 16 to 24 were obtained. In the solutions (M-X), as components to provide a water fastness, compounds shown in Table 2 were used and the compositions thereof were shown in Table 5.

To the recording paper sheets, image forming was performed using the inks shown in Table 5, using the same ink with the same printing procedure and under the same conditions as in Example 14, and the printed images were evaluated as same as in Example 14. The inks in Table 5 contained the same components as in Example 1, except other components set forth in Table 5. The amount of water in the solutions and inks was adjusted so as to make up 100 parts. Results are shown in Table 4.
(Compositions of M-X):
   10 parts of pulverized silica (Sylysia 470, trade name, a product of Fuji Silysia Co.);
   7 parts of polyvinyl alcohol (Gohsenol NL-06, trade name, a product of Nihon Gohsei Chem. Co.); and
   x parts of a component to provide a water fastness.

COMPARATIVE EXAMPLE 3

Printing was performed to the base paper sheet P-2 above (not impregnated with solution M-3) using the same ink with the same printing procedure and under the same conditions as in Example 14, and the printed characters were evaluated as same as in Example 14. Results are shown in Table 4.

COMPARATIVE EXAMPLE 4

The base paper sheet P-2 was impregnated with a solution, in which a cationic compound was eliminated from the solution M-3, containing only a polymeric compound and water, (an applied amount of the solution to the base paper sheet was made 2 $g/m^2$) as same as in Example 14 to obtain a recording paper sheet. To the recording paper sheet, printing was performed using the same ink with the same printing procedure and under the same conditions as in Example 14, and the printed characters were evaluated as same as in Example 14. Results are shown in Table 4.

COMPARATIVE EXAMPLE 5

A solution was prepared using only 7 parts of PAA-HCl-10L (trade name, polyallylamine hydrochloride of molecular weight of ca. 100,000, a product of Nitto Boseki Co.) as a component to provide a water fastness for a solution (M-X). A recording paper sheet was prepared using this solution as same as in Example 14, or Examples 16 to 24, except this solution was used in place of the solution of Example 14. And to this recording paper sheet, printing was performed using the same ink with the same printing procedure and under the same conditions as in Example 14, or Examples 16 to 24. The printed characters were evaluated as same as in Example 14. Results are shown in Table 4.

As clear from the results of Examples 14 to 24 in Table 4, images superior in an image density, a resistance to bleeding and a water fastness could be obtained. On the contrary, in Comparative Examples 3 and 4, merely images having a low image density and a poor resistance to bleeding were obtained, and a water fastness of images was also inferior. Further in Comparative Example 5, images were good in a water fastness, but inferior a little in an image density, a resistance to bleeding and a light fastness.

Upon observing the surface conditions of the recording paper sheets of Examples 14 to 24 by means of a scanning electron microscope, it was found out that one or more pulp fibers of more than 100 μm length, which was supposed as to be a form of a fiber, were recognized within the area of 1 $mm^2$ on the paper surface, and the fibers were covered with a pigment (silica), by which the surface was in the conditions that the fibers were exposed partially. On the contrary, by the surface conditions of recording paper sheet of Comparative Example 3 it was observed that pulp fibers covered the whole surface of paper.

TABLE 4

| | Evaluation Items | | | |
|---|---|---|---|---|
| | Image density | Resistance to bleeding | Water fastness | Light fastness |
| Comparative Example 3 | 0.96 | C | C | 80% |
| Comparative Example 4 | 1.37 | B | C | 86% |
| Comparative Example 5 | 1.25 | C | B | 53% |
| Example 14 | 1.38 | A | B | 83% |
| Example 15 | 1.40 | A | B | 83% |
| Example 16 | 1.43 | A | B | 82% |
| Example 17 | 1.35 | A | A | 78% |
| Example 18 | 1.33 | A | A | 76% |
| Example 19 | 1.41 | A | B | 84% |
| Example 20 | 1.44 | A | B | 83% |
| Example 21 | 1.48 | A | B | 83% |
| Example 22 | 1.49 | A | A | 77% |

TABLE 4-continued

| | Evaluation Items | | | |
|---|---|---|---|---|
| | Image density | Resistance to bleeding | Water fastness | Light fastness |
| Example 23 | 1.52 | A | B | 83% |
| Example 24 | 1.52 | A | A | 76% |

TABLE 5

| | Solution to be impregnated into recording paper (component to provide water fastness) | | Ink Component |
|---|---|---|---|
| | Low molecular cationic compound | Polymeric compound | other than dye, water and solvent |
| Example 16 | BTBAC (3.5) | K-126 (3.5) | same as Ex. 14 |
| Example 17 | BTBAC (4.0) | K-126 (1.5)/ PAA-HCl-3L (1.5) | same as Ex. 14 |
| Example 18 | BTBAC (4.0) | K-126 (1.5)/ PAS-120 (1.5) | same as Ex. 14 |
| Example 19 | G-50 (4.0) | same as Ex. 16 | same as Ex. 14 |
| Example 20 | G-50 (4.0) | same as Ex. 16 | Emal D (1.0) |
| Example 21 | G-50 (3.5) | Sanflock 700 (3.5) | same as Ex. 14 |
| Example 22 | G-50 (4.0) | Sanflock 700 (1.5)/PAS-92 (1.5) | same as Ex. 14 |
| Example 23 | G-50 (3.5) | same as Ex. 21 | same as Ex. 20 |
| Example 24 | G-50 (4.0) | same as Ex. 22 | same as Ex. 20 |

Note:
The figures in the parentheses are an amount added (parts).

EXAMPLE 25

Preparation of a Recording Sheet

To a polyethylene terephthalate film (100 μm thick, Lumirror, a product of Toray Co.), a solution (M-5) prepared from the components mentioned below was applied by a bar coater so as to make a coating thickness of 10 μm, and then the film was dried in an oven at 120° C. for 3 minutes to obtain a recording sheet.

(Composition of M-5):

1.5 parts of a cationic compound (Benzyltributylammomonium chloride, BTBAC, trade name, a product of Sanyo Chemical Co.);

10 parts of a polymeric compound (a cationic compound) (Cationized polyvinyl alcohol, CM-318, trade name, a product of Kuraray Co.); and balance of water up to 100 parts in total.

To the thus obtained recording sheet, image forming was performed using the same ink with the same printing procedure and under the same conditions as in Example 1. The printed images were evaluated with procedures regarding to the items mentioned below, and ranked with the standards as follows.

(1) Image Density:

A solid print image of 100% duty was printed with a black ink. After leaving it for 12 hours, transmitted density was measured with a transmission densitometer, MacBeth TR 524 (a product of MacBeth Co).

(2) Resistance to Bleeding:

Solid print samples were printed with inks of 100%, 200% and 300 duties, respectively, adjacent to each other. The print samples were projected by a transmission projector, M 4000 (a product of Sumitomo Three-M Co.), and a degree of bleeding at a boundary between colors of the projected images was evaluated visually. The resistance to bleeding was ranked as A which was in a level of substantially no problem of bleeding, B which was other then A.

(3) Resistance to Bleeding During Storage:

Characters were printed with a magenta ink on an yellow solid print portion of 100% duty superimposingly, and then the samples were put into a transparent holder for a filing binder (Clearpocket CL-303, a product of Lion Co.) and left for 10 days under conditions of temperature of 30° C. and a humidity of 80%. Thereafter, the print samples were projected by a transmission projector, M 4000 (a product of Sumitomo Three-M Co.), and a quality of the projected characters was evaluated with eyes. The resistance to bleeding during storage was ranked as AA where no running nor bolding of characters were recognized, A where no running in characters was recognized but bolding of characters was recognized, B where a level of bolding of characters was recognized worse than a level of A, and C which was other than the above. Results are shown in Table 6.

EXAMPLE 26 to 41

To a polyethylene terephthalate film (100 μm thick, Lumirror, a product of Toray Co.), solutions prepared from the components mentioned below were applied by a bar coater so as to make a coating thickness of 10 μm, respectively, and then the films were dried in an oven at 120° C. for 3 minutes to obtain recording sheets used in Examples 26 through 41.

To the thus obtained respective recording sheet, image forming was performed using the same ink with the same printing procedure and under the same conditions as in Example 25. The printed images were evaluated with procedures same as in Example 25. Results are shown in Tables 6 and 7.

(Composition of the Coating Solution of Example 26):
- 10 parts of a cationized polyvinyl alcohol (CM-318, trade name, a product of Kuraray Co.);
- 1.5 parts of a cationic compound (Benzyltributylammomonium chloride, BTBAC, trade name, a product of Sanyo Chemical Co.);
- 0.1 part of a polymeric compound, (Cationic compound polyallylamine hydrochloride, PAA-HCl 3L, trade name, a product of Nitto Boseki Co.); and
- balance of water up to 100 parts in total.

(Composition of the Coating Solution of Example 27):
- 10 parts of a cationized polyvinyl alcohol (CM-318, trade name, a product of Kuraray Co.);
- 1.5 parts of a cationic compound (Benzyltributylammomonium chloride, BTBAC, trade name, a product of Sanyo Chemical Co.);
- 0.1 part of a polymeric compound (Cationic compound, polyallylamine hydrochloride, PAA-HCl 3L, trade name, a product of Nitto Boseki Co.);
- 0.5 part of a surfactant (Acetylene glycol-EO adduct, Acetylenol EH, trade name, a product of Kawaken Fine Chem. Co.); and
- balance of water up to 100 parts in total.

(Composition of the Coating Solution of Example 28):
- 10 parts of polyvinyl alcohol 217 (trade name, a product of Kuraray Co.);
- 1.5 parts of a cationic compound (Benzyltributylammomonium chloride, BTBAC, trade name, a product of Sanyo Chemical Co.);
- 0.1 part of a polymeric compound (Cationic compound, polyallylamine hydrochloride, PAA-HCl 3L, trade name, a product of Nitto Boseki Co.); and
- balance of water up to 100 parts in total.

(Composition of the Coating Solution of Example 29):
- 10 parts of polyvinyl alcohol 217 (trade name, a product of Kuraray Co.);
- 1.5 parts of a cationic compound (Benzyltributylammomonium chloride, BTBAC, trade name, a product of Sanyo Chemical Co.);
- 0.1 part of a polymeric compound (Cationic compound, polyallylamine hydrochloride, PAA-HCl 3L, trade name, a product of Nitto Boseki Co.);
- 0.5 part of a surfactant (Acetylene glycol-EO adduct, Acetylenol EH, trade name, a product of Kawaken Fine Chem. Co.); and balance of water up to 100 parts in total.

(Composition of the Coating Solution of Example 30):
- 10 parts of polyvinyl pyrrolidone (K-120, trade name, a product of GAF Co.);
- 1.5 parts of a cationic compound (Benzyltributylammomonium chloride, BTBAC, trade name, a product of Sanyo Chemical Co.);
- 0.1 part of a polymeric compound (Cationic compound, polyallylamine hydrochloride, PAA-HCl 3L, trade name, a product of Nitto Boseki Co.); and
- balance of water up to 100 parts in total.

(Composition of the Coating Solution of Example 31):
- 10 parts of polyvinyl pyrrolidone (K-120, trade name, a product of GAF Co.);
- 1.5 parts of a cationic compound (Benzyltributylammomonium chloride, BTBAC: trade name, a product of Sanyo Chemical Co.);
- 0.1 part of a polymeric compound (Cationic compound, polyallylamine hydrochloride, PAA-HCl 3L, trade name, a product of Nitto Boseki Co.);
- 0.5 part of a surfactant (Acetylene glycol-EO adduct, Acetylenol EH, trade name, a product of Kawaken Fine Chem. Co.); and
- balance of water up to 100 parts in total.

(Composition of the Coating Solution of Example 32):
- 10 parts of polyvinyl acetal (KW-1, trade name, a product of Sekisui Chem. Co.);
- 1.5 parts of a cationic compound (Benzyltributylammomonium chloride, BTBAC, trade name, a product of Sanyo Chemical Co.);
- 0.1 part of a polymeric compound (Cationic compound, polyallylamine hydrochloride, PAA-HCl 3L, trade name, a product of Nitto Boseki Co.); and
- balance of water up to 100 parts in total.

(Composition of the Coating Solution of Example 33):
- 10 parts of polyvinyl acetal (KW-1, trade name, a product of Sekisui Chem. Co.);
- 1.5 parts of a cationic compound (Benzyltributylammomonium chloride, BTBAC, trade name, a product of Sanyo Chemical Co.);
- 0.1 part of a polymeric compound (Cationic compound, Polyallylamine hydrochloride, PAA-HCl 3L, trade name, a product of Nitto Boseki Co.);
- 0.5 part of a surfactant (Acetylene glycol-EO adduct, Acetylenol EH, trade name, a product of Kawaken Fine Chem. Co.); and
- balance of water up to 100 parts in total.

(Composition of the Coating Solution of Example 34):
- 10 parts of a cationized polyvinyl alcohol (CM-318, trade name, a product of Kuraray Co);
- 1.5 parts of a cationic compound (Benzyltributylammomonium chloride, BTBAC, trade name, a product of Sanyo Chemical Co.);
- 0.1 part of a polymeric compound (Cationic compound, polyamine sulfone, PAS-92, trade name, a product of Nitto Boseki Co.); and
- balance of water up to 100 parts in total.

(Composition of the Coating Solution of Example 35):
- 10 parts of a cationized polyvinyl alcohol (CM-318, trade name, a product of Kuraray Co.);
- 1.5 parts of a cationic compound (Benzalkonium chloride, G-50: trade name, a product of Sanyo Chemical Co.);
- 0.1 part of a polymeric compound (Cationic compound, polyamine sulfone, PAS-92, trade name, a product of Nitto Boseki Co.); and
- balance of water up to 100 parts in total.

(Composition of the coating solution of Example 36):
- 10 parts of a cationized polyvinyl alcohol (CM-318, trade name, a product of Kuraray Co.);
- 1.5 parts of a cationic compound (Benzyltributylammomonium chloride, BTBAC: trade name, a product of Sanyo Chemical Co.);
- 0.1 part of a polymeric compound (Cationic compound, polyamine sulfone, PAS-120, trade name, a product of Nitto Boseki Co.); and
- balance of water up to 100 parts in total.

(Composition of the Coating Solution of Example 37):
- 10 parts of a cationized polyvinyl alcohol (CM-318, trade name, a product of Kuraray Co);
- 1.5 parts of a cationic compound (Benzalkonium chloride, G-50, trade name, a product of Sanyo Chemical Co.);
- 0.1 part of a polymeric compound (Cationic compound, polyamine sulfone, PAS-120, trade name, a product of Nitto Boseki Co.); and
- balance of water up to 100 parts in total.

(Composition of the Coating Solution of Example 38):
- 10 parts of polyvinyl alcohol 217 (trade name, a product of Kuraray Co.);
- 1.5 parts of a cationic compound (Benzyltributylammomonium chloride, BTBAC, trade name, a product of Sanyo Chemical Co.);
- 0.1 part of a polymeric compound (Cationic compound, polyamine sulfone, PAS-92, trade name, a product of Nitto Boseki Co.); and
- balance of water up to 100 parts in total.

(Composition of the Coating Solution of Example 39):
- 10 parts of polyvinyl alcohol 217 (trade name, a product of Kuraray Co.);
- 1.5 parts of a cationic compound (Benzalkonium chloride, G-50, trade name, a product of Sanyo Chemical Co.);
- 0.1 part of a polymeric compound (Cationic compound, polyamine sulfone, PAS-92, trade name, a product of Nitto Boseki Co.); and
- balance of water up to 100 parts in total.

(Composition of the Coating Solution of Example 40):
- 10 parts of polyvinyl alcohol 217 (trade name, a product of Kuraray Co);
- 1.5 parts of a cationic compound (Benzyltributylammomonium chloride, BTBAC, trade name, a product of Sanyo Chemical Co.);
- 0.1 part of a polymeric compound (Cationic compound, polyamine sulfone, PAS-120, trade name, a product of Nitto Boseki Co.); and
- balance of water up to 100 parts in total.

(Composition of the Coating Solution of Example 41):
- 10 parts of polyvinyl alcohol 217 (trade name, a product of Kuraray Co.);
- 1.5 parts of a cationic compound (Benzalkonium chloride, G-50, trade name, a product of Sanyo Chemical Co.);
- 0.1 part of a polymeric compound (Cationic compound, polyamine sulfone, PAS-120, trade name, a product of Nitto Boseki Co.); and
- balance of water up to 100 parts in total.

EXAMPLE 42

A preparation of recording sheets and image forming were performed using the same materials and under the same conditions as in Example 25, except that 1.0 part of an anionic surfactant, sodium lauryl sulfate (Emal D, a product of Kao Co.), was added to each ink. Printed images were evaluated as same as in Example 25. Results are shown in Table 7.

EXAMPLE 43

A preparation of recording sheets and image forming were performed using the same materials and under the same conditions as in Example 25, except that an acrylic plate was used as a substrate. Printed images were evaluated as same as in Example 25. Results are shown in Table 7.

EXAMPLE 44

A preparation of recording sheets and image forming were performed using the same materials and under the same conditions as in Example 28, except that an acrylic plate was used as a substrate. Printed images were evaluated as same as in Example 28. Results are shown in Table 7.

COMPARATIVE EXAMPLES 6 to 8

To a polyethylene terephthalate film (100 μm thick, Lumirror, a product of Toray Co.), solutions prepared from the components mentioned below were applied by a bar coater so as to make a coating thickness of 10 μm, respectively, and then the films were dried in an oven at 120° C. for 3 minutes to obtain recording sheets used in Comparative Examples 6 to 8.

To the thus obtained recording sheets, an image forming was performed using the same ink and with the same printing procedure and under the same conditions as in Example 25. The printed images were evaluated as same as in Example 25. Results are shown in Table 6.

(Composition of the Coating Solution of Comparative Example 6):
- 10 parts of a cationized polyvinyl alcohol, (CM-318, trade name, a product of Kuraray Co.); and
- balance of water up to 100 parts in total.

(Composition of the Coating Solution of Comparative Example 7):
- 10 parts of polyvinyl alcohol 217 (trade name, a product of Kuraray Co.); and
- balance of water up to 100 parts in total.

(Composition of the Coating Solution of Comparative Example 8):
- 10 parts of polyvinyl alcohol 217 (trade name, a product of Kuraray Co.);

1.5 parts of a cationic compound (Polyallyamine PAA-HCl 3L, molecular weight: ca. 10,000, trade name, a product of Nitto Boseki Co.); and balance of water up to 100 parts in total.

REFERENCE EXAMPLE 1

To a polyethylene terephthalete film (100 μm thick, Lumirror, a product of Toray Co.), a solution prepared from the components mentioned below was applied by a bar coater so as to make a coating thickness of 10 μm, and then the film was dried in an oven at 120° C. for 3 minutes to obtain recording sheet.

To the thus obtained recording sheet, image forming was performed using the same ink and with the same printing procedure and under the same conditions as in Example 25. The printed images were evaluated as same as in Example 25. Results are shown in Table 6.

(Composition of the Coating Solution of Reference Example 6):

10 parts of polyvinyl alcohol 217 (trade name, a product of Kuraray Co.);

1.5 part of a cationic compound (Benzyltributylammomonium chloride, BTBAC, trade name, a product of Sanyo Chemical Co.); and balance of water up to 100 parts in total.

As clear from the results of Examples 25 to 44 in Tables 6 and 7, images superior in an image density, a resistance to bleeding and a resistance to bleeding during storage can be obtained. On the contrary, in Comparative Examples 6 and 7, only images having a low image density and a poor resistance to bleeding were obtained, and a resistance to bleeding during storage of images was also inferior. Further in Comparative Example 8, images were good in a resistance to bleeding during storage, but inferior a little in an image density, and bleeding occurred.

TABLE 6

| | Evaluation Items | | |
|---|---|---|---|
| | Image density | Resistance to bleeding | Resistance to bleeding during storage |
| Comparative Example 6 | 1.23 | A | C |
| Comparative Example 7 | 1.23 | B | C |
| Comparative Example 8 | 1.00 | B | A |
| Reference Example 1 | 1.23 | A | B |
| Example 25 | 1.41 | A | A |
| Example 26 | 1.42 | A | A |
| Example 27 | 1.41 | A | A |
| Example 28 | 1.44 | A | A |
| Example 29 | 1.45 | A | A |
| Example 30 | 1.44 | A | A |
| Example 31 | 1.45 | A | A |
| Example 32 | 1.49 | A | AA |

TABLE 7

| | Evaluation Items | | |
|---|---|---|---|
| | Image density | Resistance to bleeding | Resistance to bleeding during storage |
| Example 33 | 1.50 | A | AA |
| Example 34 | 1.43 | A | A |
| Example 35 | 1.57 | A | A |
| Example 36 | 1.39 | A | AA |
| Example 37 | 1.47 | A | A |
| Example 38 | 1.44 | A | AA |
| Example 39 | 1.54 | A | A |
| Example 40 | 1.44 | A | A |
| Example 41 | 1.52 | A | A |
| Example 42 | 1.47 | A | A |
| Example 43 | 1.46 | A | A |
| Example 44 | 1.47 | A | A |

EXAMPLE 45

Preparation of Base Paper Sheet

To a mixture of 80 parts of LBKP and 20 parts of NBKP, which was beated to C.S.F. 430 ml as a starting material pulp, 10 parts of kaolin (produced by Tsuchiya Kaolin Co.), 0.4 part of a cationized starch, 0.2 part of polyacrylamide (a product of Harima Chem. Co.) and further 0.1 part of a neutral rosin sizing agent (Sizepine NT, a product of Arakawa Chem. Co.) were incorporated to obtain a base paper sheet having a base weight of 80 g/m$^2$ by a conventional paper-making process.

This base paper sheet was impregnated with a solution prepared from the following components, and after drying it in an oven at 120° C. for 1 minute a recording paper sheet according to the present invention was obtained, a dry coated amount of which was 0.5 g/m$^2$.

(Composition of the Coating Solution):

0.2 part of basic aluminium lactate (Takiserum G-17P, trade name, a product of Taki Chem. Co.);

0.8 part of polyallylamine hydrochloride (PAA-HCl-3H, molecular weight: ca. 10,000, trade name, a product of Nitto Boseki Co.); and 99.0 parts of water.

Preparation of Inks

Further, following components were mixed and then the resulted solutions were filtered under pressure by means of a membrane filter having a pore size of 0.22 μm (Fluoropore filter, trade name, a product of Sumitomo Electric Co.) to obtain Yellow Ink (2)-Y, Magenta Ink (2)-M, Cyan Ink (2)-C and Black Ink (2)-K, respectively.

Yellow Ink (2)-Y:

2 parts of C.I Direct Yellow 86, 10 parts of thiodiglycol, 4 parts of urea, 0.1 part of Acetylenol EH (a surfactant, a product of Kawaken Fine Chem. Co.), and balance of water up to 100 parts.

Magenta Ink (2)-M:

The composition was the same as Yellow Ink (2)-Y, except that 2.5 parts of C.I. Acid Red 35 was used in place of 2 parts of C.I Direct Yellow 86. Cyan Ink (2)-C:

The composition was the same as Yellow Ink (2)-Y, except that 2.5 parts of C.I. Direct Blue 199 was used in place of 2 parts of C.I Direct Yellow 86.

Black Ink (2)-K:

The composition was the same as Yellow Ink (2)-Y, except that 3 parts of C.I. Food Black 2 was used in place of 2 parts of C.I Direct Yellow 86.

Using the thus obtained recording paper sheets and inks, a color image was formed by means of a printing apparatus equipped with a printing head of an ink-jet system to eject ink droplets by an action of heat, which printing head had 14 recording orifices per mm, and printed images were evaluated. Result are shown in Table 8.

(1) Image density and (2) Water fastness were evaluated as same as in Example 1. Light fastness and overall evaluation were evaluated as follows.

(3) Light Fastness:

A solid print of magenta similar to the one used in evaluating the image density was prepared and an Xenon lamp light was irradiated to the samples using Atlas fade-o-meter (produced by Toyo Seiki Co.) for 30 hours, and print samples before and after the irradiation were compared. Light fastness of the samples was ranked as A where no discoloration occurred after irradiation, C where discoloration after irradiation was noticeable, and B which was in the middle of A and C.

(4) Overall Evaluation:

Overall evaluation was ranked as A when an ink-jet property was evaluated synthetically good, B where there was some problems in practical use.

EXAMPLE 46

The recording paper sheet of the present invention was prepared similar to Example 45, except that following components were used. Result are shown in Table 8.

(Composition of the Coating Solution):

0.4 part of basic aluminium lactate (Takiserum G-17P, trade name, a product of Taki Chem. Co.);

0.6 part of polyallylamine hydrochloride (PAA-10C, trade name, a product of Nitto Boseki Co.); and 99.0 parts of water.

Polyallylamine and water were mixed, and the resulted aqueous solution was adjusted to pH 6.5, and further basic aluminium lactate was added to obtain the coating solution.

EXAMPLE 47

To the base paper sheet obtained by Example 45, a coating solution prepared from the following components was applied so as to make a dry coated amount of 8.5 g/m² by a bar coater to obtain a recording paper used in Example 47. The print samples were evaluated as same as in Example 45. Result are shown in Table 8.

(Composition of the Coating Solution):

10 parts of pulverized silica (Mizukasil P-78D, a product of Mizusawa Chem. Co.);

4 parts of polyvinyl alcohol (PVA 117, a product of Kuraray Co.);

0.4 part of basic aluminium lactate, (Takiserum G-17P, trade name, a product of Taki Chem. Co.);

0.6 part of polyallylamine hydrochloride (PAA-HCl-3L, molecular weight: ca. 10,000, a product of Nitto Boseki Co.); and 85.0 parts of water.

EXAMPLE 48

To the base paper sheet, a coating solution of the following composition was applied so as to make a dry coated amount of 10 g/m² by an applicator, and then treated with a 10% aqueous solution of calcium formate, and the treated wet sample was pressed on a stainless roll heated to 100° C. and dried to obtain recording paper sheets having a mirror-like glossiness of the surface of the present invention. The print samples were evaluated as same as in Example 45. Results are shown in Table 8.

(Composition of the Coating Solution):

6 parts of pulverized silica (Mizukasil P-78D, a product of Mizusawa Chem. Co.);

1 part of polyvinyl alcohol (PVA 117, a product of Kuraray Co.);

1 part of a styrene-butadiene latex (a product of Sumitomo Norgatack Co.);

0.2 part of basic aluminium lactate (Takiserum G-17P, trade name, a product of Taki Chem. Co.);

0.8 part of polyallylamine hydrochloride (PAA-HCl-3L, molecular weight: ca. 10,000, a product of Nitto Boseki Co.); and 91.8 parts of water.

EXAMPLE 49

A recording paper sheet was prepared similar to Example 47, except that powdered alumina (AKP-G015, a product of Sumitomo Chem. Co.) was used in place of silica and evaluated. Results are shown in Table 8.

TABLE 8

|  | Evaluation Items | | | |
| --- | --- | --- | --- | --- |
|  | Image density | Water fastness | Light fastness | Overall evaluation |
| Example 45 | 1.04 | A | B | A |
| Example 46 | 1.05 | A | B | A |
| Example 47 | 1.36 | A | B | A |
| Example 48 | 1.43 | A | B | A |
| Example 49 | 1.39 | A | B | A |

EXAMPLE 50

Preparation of Recording Sheet

To a polyethylene terephthalate film (100 µm thick, Lumirror, a product of Toray Co.), a solution prepared from the components mentioned below was applied by a bar coater so as to make a dry coating thickness of 10 µm, and then the film was dried in an oven at 120° C. for 3 minutes to obtain recording sheets.

(Composition of the Coating Solution):

10 parts of cationized polyvinyl alcohol C-506 (a product of Kuraray Co.);

0.2 part of basic aluminium lactate (Takiserum G-17P, trade name, a product of Taki Chem. Co.);

0.8 part of polyallylamine hydrochloride (PAA-HCl-3L, molecular weight: ca. 10,000, a product of Nitto Boseki Co.); and balance of water up to 100 parts.

On the recording sheets thus obtained, color images were formed and evaluated similar as in Example 45. Results are shown in Table 9.

TABLE 9

| | Evaluation Items | | | |
| --- | --- | --- | --- | --- |
| | Image density | Water fastness | Light fastness | Overall evaluation |
| Example 50 | 1.32 | A | B | A |

EXAMPLES 51 and 52

The base paper sheet obtained in Example 45 was impregnated with a coating solution of the following composition and then the paper was dried in an oven at 120° C. for 1 minute to obtain the recording paper sheet of the present invention having a dry coated amount of 0.5 g/m$^2$. Evaluation was carried out similar as in Example 45. Results are shown in Table 10.

(Composition of the Coating Solution of Example 51):
- 0.2 part of basic polyaluminium chloride (Paho # 2S, a product of Asada Chem. Co.);
- 0.8 part of polyallylamine hydrochloride (PAA-HCl-3L, molecular weight: ca. 10,000, a product of Nitto Boseki Co.); and
- 99.0 parts of water.

(Composition of the Coating Solution of Example 52):
- 0.4 part of basic polyaluminium chloride (Takibine #1500, a product of Taki Chem. Co.);
- 0.6 part of polyallylamine hydrochloride (PAA-10C, a product of Nitto Boseki Co.); and 99.0 parts of water.

Polyallylamine and water were mixed, and the resulted aqueous solution was adjusted to pH 5.0, and further basic polyaluminium chloride was added to obtain a coating solution.

EXAMPLE 53

To the base paper sheet obtained in Example 45, a coating solution of the following composition was applied so as to make a dry coated amount of 8.5 g/m$^2$ by a bar coater method to obtain a recording paper sheet of the present invention. The print samples were evaluated as same as in Example 45. Results are shown in Table 10.

(Composition of the Coating Solution):
- 10 parts of pulverized silica (Mizukasil P-78D, a product of Mizusawa Chem. Co.);
- 4 parts of polyvinyl alcohol (PVA 117, a product of Kuraray Co.);
- 0.4 part of basic polyaluminium chloride, (Paho # 2S, a product of Asada Chem. Co.);
- 0.6 part of polyallylamine hydrochloride, (PAA-HCl-3L, molecular weight: ca. 10,000, a product of Nitto Boseki Co.); and
- 85.0 parts of water.

EXAMPLES 54 and 55

To the base paper sheet obtained in Example 45, coating solutions of the following compositions were applied so as to make a dry coated amount of 10 g/m$^2$ each by an applicator, and then treated with a 10% aqueous solution of calcium formate, and the treated wet samples were pressed on a stainless roll heated to 100° C. and dried to obtain recording paper sheets having a mirror-like glossiness of the surface of the present invention, respectively. The print samples were evaluated. Results are shown in Table 10.

(Composition of the Coating Solution of Example 54):
- 6 parts of pulverized silica (Mizukasil P-78D, a product of Mizusawa Chem. Co.);
- 1 part of polyvinyl alcohol (PVA 117, a product of Kuraray Co.);
- 1 part of a styrene-butadiene latex (a product of Sumitomo Norgatack Co.);
- 0.2 part of basic polyaluminium chloride, (Paho # 2S, a product of Asada Chem. Co.);
- 0.8 part of polyallylamine hydrochloride (PAA-HCl-3L, molecular weight: ca. 10,000, a product of Nitto Boseki Co.); and
- 91.0 parts of water.

(Composition of the Coating Solution of Example 55):
The composition was the same as in Example 54, except that powdered alumina (AKP-G015, trade name, a product of Sumitomo Chem. Co.) was used in place of the pulverized silica.

EXAMPLE 56

The recording paper sheet of the present invention was prepared using a coating solution of the following composition similar as in Example 51, except that the coated dry amount was made 2 g/m$^2$. Results are shown in Table 10.

(Composition of the Coating Solution):
- 0.8 part of basic polyaluminium chloride (Paho # 2S, a product of Asada Chem. Co.);
- 3.2 parts of polyallylamine hydrochloride (PAA-HCl-3L, molecular weight: ca. 10,000, a product of Nitto Boseki Co.); and
- 96.0 parts of water.

TABLE 10

| | Coated weight (g/m$^2$) | Evaluation Items | |
| --- | --- | --- | --- |
| | | Image density | water fastness |
| Example 51 | 0.5 | 1.06 | A |
| Example 52 | 0.5 | 1.07 | A |
| Example 53 | 8.5 | 1.38 | A |
| Example 54 | 10.0 | 1.45 | A |
| Example 55 | 8.5 | 1.41 | A |
| Example 56 | 2.0 | 1.04 | B |

As clear from the results of Examples 51 to 56 in Table 10, images having a superior water fastness were obtained.

EXAMPLE 57

Preparation of Recording Sheets

To a polyethylene terephthalate film (100 $\mu$m thick, Lumirror, a product of Toray Co.), a solution prepared from the components mentioned below was applied by a bar coater so as to make a dry coating thickness of 10 $\mu$m, and then the film was dried in an oven at 120° C. for 3 minutes to obtain recording sheets used in Example 57.

(Composition of the Coating Solution):
- 10 parts of cationized polyvinyl alcohol C-506 (a product of Kuraray Co.);
- 0.2 part of basic polyaluminium chloride (Paho # 2S, a product of Asada Chem. Co.);
- 0.8 part of polyallylamine hydrochloride (PAA-HCl-3L, molecular weight: ca. 10,000, a product of Nitto Boseki Co.); and
- balance of water up to 100 parts.

On the recording sheets thus obtained, color images were formed similar as in Example 51, and evaluation was performed with respect to an image density and a resistance to bleeding during storage. Results are shown in Table 11.

TABLE 11

| | Evaluation Items | |
|---|---|---|
| | Image density | Resistance to bleeding during storage |
| Example 57 | 1.34 | AA |

EXAMPLES 58 to 60

Preparation of Base Paper Sheets A and B

To a mixture of 80 parts of LBKP and 20 parts of NBKP, which was beated to C.S.F. 430 ml as a starting material pulp, and then 10 parts of kaolin (produced by Tsuchiya Kaolin Co.), 0.4 part of a cationized starch, 0.2 part of polyacrylamide (a product of Harima Chem. Co.) and further 0.075 part of a neutral rosin sizing agent (Sizepine NT, a product of Arakawa Chem. Co.) were incorporated to make a base paper sheet A having a basis weight of 80 g/m$^2$ by a conventional paper-making process. A base paper sheet B was made similarly as in the base paper sheet A, except that an amount of a neutral rosin sizing agent was 0.4 part.

The base paper sheets A and B were each impregnated with the solution prepared from the following components, and after removing an excess water, the paper was dried in an oven at 120° C. for 1 minute to obtain recording paper sheets according to the present invention, a dry coated amount of which was 2 g/m$^2$.

(Composition of the Coating Solution of Example 58):

1.6 part of polyallylamine (PAA-10C, molecular weight: ca. 10,000, a product of Nitto Boseki Co.);

0.4 part of benzalkonium chloride (G-50, a product of Sanyo Chem. Co.); and 98 parts of water.

(Composition of the Coating Solution of Example 59):

1.2 part of polyallylamine (PAA-10C, a product of Nitto Boseki Co.);

0.8 part of benzyltributylammonium chloride (BTBAC, a product of Sanyo Chem. Co.); and 98 parts of water.

(Composition of the Coating Solution of Example 60):

1.8 part of polyallylamine (PAA-H, molecular weight: ca. 10,000, a product of Nitto Boseki Co.);

0.2 part of benzalkonium chloride (G-50, a product of Sanyo Chem. Co.); and 98 parts of water.

To the recording paper sheets, color images were formed similarly as in Example 45, and the printed images were evaluated. Results are shown in Table 12.

(1) Image density and (3) a water fastness were evaluated as same as in Example 1. (6) Overall evaluation was evaluated as same as in Example 45. A coloring ability, a fastness to ozone and an image quality were evaluated, as follows.

(2) Coloring Ability:

Print samples were evaluated visually. Coloring ability of the sample was ranked, with respect to a hue on the printed portions of Magenta and Cyan, as A where a saturation was high and the print was seen brilliant, and B where a saturation was low and the print was seen dark.

(4) Ozone Fastness:

Solid print samples of black and cyan as same as used in the evaluation of image density were exposed for 2 hours under atmosphere of an ozone concentration of 3 ppm in an Ozone fade-o-meter (Suga tester). The samples were evaluated by measuring a ratio of image density after exposure to that before exposure and also observing a change of hues. Ozone fastness of the sample was ranked as B where a ratio of image density after the test to that before the test was not more than 85%, or the hue of black print after the test was changed brownish, and A which was not corresponding to either one, and in particular, AA where a ratio of image density after the test to that before the test was not less than 95%.

(5) Image Quality:

Solid print images of 100% and 200% duties were printed adjacent to each other. A boundary of colors was evaluated visually. Image quality was ranked as A where the boundary could be discriminated clear as a line, B where the boundary was a little unclear but could be discriminated, C where color mixing occurred and the boundary could not be clearly discriminated.

EXAMPLE 61

The recording paper sheet of the present invention was prepared by using a coating solution of the following composition as same as in Example 58, except that the coating solution was applied so as to make a dry coating weight of 8 g/m$^2$. Evaluation was carried out similarly as in Example 58. Results are shown in Table 12.

(Composition of the Coating Solution):

10 parts of pulverized silica (Mizukasil P-78D, a product of Mizusawa Chem. Co.);

4 parts of polyvinyl alcohol (PVA 117, a product of Kuraray Co.);

4 parts of polyallylamine (PAA-10C, a product of Nitto Boseki Co.);

2 parts of benzalkonium chloride (G-50); and balance of water up to 100 parts.

EXAMPLE 62

A base paper sheet was coated with a coating solution of the following composition so as to make a dry coated amount of 10 g/m$^2$ by an applicator, and then treated with a 10% aqueous solution of calcium formate, and the treated wet sample was pressed on a stainless roll heated to 100° C. and dried to obtain recording paper sheets having a mirror-like glossiness of the surface of the present invention. The print samples were evaluated. Results are shown in Table 12.

(Composition of the Coating Solution):

6 parts of pulverized silica (Mizukasil P-78D, a product of Mizusawa Chem. Co.);

1 part of polyvinyl alcohol (PVA 117, a product of Kuraray Co.);

1 part of a styrene-butadiene latex (a product of Sumitomo Norgatack Co.);

2 parts of polyallylamine (PAA-10C, a product of Nitto Boseki Co.);

0.4 part of benzalkonium chloride (G-50), and balance of water up to 100 parts.

Evaluation was carried out similarly as in Example 58. Result are shown in Table 12.

TABLE 12

| | Base paper sheer | Evaluation Items | | | | | |
|---|---|---|---|---|---|---|---|
| | | (i) | (ii) | (iii) | (iv) | (v) | (vi) |
| Example 58 | A | 1.28 | A | AA | A | A | A |
| Example 59 | B | 1.30 | A | AA | A | A | A |
| Example 60 | A | 1.26 | A | AA | A | A | A |
| Example 61 | B | 1.45 | A | AA | A | A | A |
| Example 62 | A | 1.43 | A | AA | A | A | A |

Note:
(i) Image density,
(ii) Coloring ability,
(iii) Water fastness,
(iv) Ozone fastness,
(v) Image quality, and
(vi) Overall evaluation.

As described above, the present invention provides a recording medium which gives fine printed image with high image density and high ink fixability. The recording medium is particularly suitable for color image formation since it causes no bleeding of color ink, and is excellent in color reproducibility. The present invention also provides an image forming method employing the above recording medium. The recording medium and the recording method of the present invention is particularly suitable for color ink-jet printing.

The recording paper sheet of the present invention comprising a base sheet composed of a fiber material and a filler has touch feeling similar to plain paper, and is also suitable for pencil writing, and causes no powder falling-off from the coat layer. This recording paper is useful also for a toner transfer paper sheet of electrophotographic copying and general purpose paper as well as the ink-jet printing paper sheet.

What is claimed is:

1. A recording medium comprising a base sheet having a surface containing aluminum lactate and a cationic polymeric substance having a weight average molecular weight of not less than 2,000.

2. The recording medium according to claim 1, wherein the cationic polymeric substance has a weight average molecular weight of from 2,000 to 10,000.

3. The recording medium according to claim 1, wherein the cationic polymeric substance is selected from the group consisting of polyallylamine, polyallylamine hydrochloride, polyaminesulfone hydrochloride, polyvinylamine hydrochloride and chitosan acetate.

4. The recording medium according to claim 1, wherein the base sheet is paper.

5. The recording medium according to claim 4, wherein the ratio by weight of aluminum lactate to the cationic polymeric substance is in a range of from 8:2 to 1:9.

6. The recording medium according to claim 4, which has a water-extract pH of 6 or higher.

7. The recording medium according to claim 4, which has a water-extract pH of 7 or higher.

8. The recording medium according to claim 4, which has a Stöckigt sizing degree of from 0 to 40 seconds.

9. The recording medium according to claim 4, which has a basis weight ranging from 50 to 150 g/m$^2$.

10. The recording medium according to claim 4, wherein the total amount of aluminum lactate and the cationic polymeric substance ranges from 0.05 to 7 g/m$^2$.

11. The recording medium according to claim 4, wherein the total amount of aluminum lactate and the cationic polymeric substance ranges from 0.3 to 3 g/m$^2$.

12. The recording medium according to claim 1, which is a recording paper sheet formed by impregnation of aluminum lactate and the cationic polymeric substance into a sheet material composed of a fiber material and a filler.

13. The recording medium according to claim 1, which is a recording paper sheet formed by application of aluminum lactate and the cationic polymeric substance onto the surface of a sheet material composed of a fiber material and a filler.

14. The recording medium according to claim 1, which comprises a fiber material and a filler and contains on a surface thereof at least a pigment in addition to aluminum lactate and the cationic polymeric substance, and the fiber material is mixed with the pigment and is partially exposed on the surface thereof.

15. The recording medium according to claim 14, wherein the amount of pigment is in a range of from 0.1 to 5 g/m$^2$.

16. The recording medium according to claim 1, which comprises a plastic sheet or a glass plate and an ink-receiving layer provided thereon, and aluminum lactate and the cationic polymeric substance are contained in the ink-receiving layer.

17. The recording medium according to claim 16, wherein the ratio by weight of aluminum lactate to the cationic polymeric substance is in a range of from 20:1 to 1:20.

18. The recording medium according to claim 16, which has a total basis weight ranging from 50 to 5,000 g/m$^2$.

19. The recording medium according to claim 16, wherein the ink-receiving layer has a basis weight ranging from 0.2 to 50 g/m$^2$.

20. The recording medium according to claim 16, wherein the total amount of aluminum lactate and the cationic polymeric substance ranges from 0.005 to 70% by weight of the ink-receiving layer.

* * * * *

UNITED STATES PATENT AND TRADEMARK OFFICE
CERTIFICATE OF CORRECTION

PATENT NO. : 6,521,323 B1
DATED : February 18, 2003
INVENTOR(S) : Sakaki et al.

It is certified that error appears in the above-identified patent and that said Letters Patent is hereby corrected as shown below:

Column 2,
Line 20, "Molt %" should read -- mol % --.

Column 5,
Line 10, "$\{Al_2(OH)_nCl_{6-n}\}^{m}$" should read -- $\{Al_2(OH)_nCl_{6-n}\}_m$ --; and
Line 13, "$\{Al(OH)_3\}20 \cdot AlCl_3$" should read -- $\{Al(OH)_3\}_{20} \cdot AlCl_3$ --.

Column 13,
Line 48, "Stbckigt" should read -- Stöckigt --.

Column 14,
Line 4, "black-ink" should read -- black ink --.

Column 15,
Line 37, "components-shown" should read -- components shown --.

Signed and Sealed this

Thirteenth Day of April, 2004

JON W. DUDAS
*Acting Director of the United States Patent and Trademark Office*